(12) United States Patent
Kusudou et al.

(10) Patent No.: US 6,992,130 B2
(45) Date of Patent: Jan. 31, 2006

(54) POLYVINYL ACETAL AND ITS USE

(75) Inventors: Takeshi Kusudou, Kurashiki (JP);
Yousuke Kumaki, Kurashiki (JP);
Naoki Fujiwara, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 118 days.

(21) Appl. No.: 10/620,465

(22) Filed: Jul. 17, 2003

(65) Prior Publication Data
US 2004/0024137 A1   Feb. 5, 2004

(30) Foreign Application Priority Data

Jul. 23, 2002 (JP) .............................. 2002-214094

(51) Int. Cl.
*C08L 29/04* (2006.01)

(52) U.S. Cl. .................. 524/503; 524/557; 525/57; 525/61

(58) Field of Classification Search ............... 525/57, 525/61; 524/503, 557
See application file for complete search history.

(56) References Cited

U.S. PATENT DOCUMENTS

| 2,396,209 | A | | 3/1946 | Sharkey | |
|---|---|---|---|---|---|
| 4,584,267 | A | * | 4/1986 | Masukawa et al. | 430/619 |
| 6,472,470 | B1 | * | 10/2002 | Fujiwara et al. | 525/61 |
| 6,803,411 | B2 | * | 10/2004 | Harita et al. | 525/56 |

FOREIGN PATENT DOCUMENTS

| DE | 29 31 035 | 2/1981 |
|---|---|---|
| EP | 0 950 696 | 10/1999 |
| EP | 1 008 605 | 6/2000 |
| EP | 1 099 672 | 5/2001 |
| EP | 1 199 317 | 4/2002 |
| JP | 63-79741 | 4/1988 |
| JP | 63-79752 | 4/1988 |
| JP | 7-314609 | 12/1995 |
| JP | 11-349889 | 12/1999 |
| JP | 2000-503341 | 3/2000 |
| JP | 2001-222089 | 8/2001 |
| JP | 2001-515527 | 9/2001 |
| JP | 2002-201215 | 7/2002 |
| WO | WO 00/18698 | 4/2000 |
| WO | WO 03/028143 | 4/2003 |

OTHER PUBLICATIONS

Derwent Publications, AN 1997-161522, XP-002256120, JP 09-031124, Feb. 4, 1997.
Derwent Publications, AN 2001-600337, XP-002256121, JP 2001-222089, Aug. 17, 2001.

* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention provides a polyvinyl acetal having a degree of acetalization of from 45 to 80 mol %, which is obtained through acetalization of a polyvinyl alcohol that contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %. The polyvinyl acetal has good waterproofness and good compatibility with plasticizer. Having the advantages, it is favorable for interlayer films for laminated glass, binders for ceramic forming, binders for ink or paint, and coating liquids for thermally-developable photographic materials.

19 Claims, No Drawings

POLYVINYL ACETAL AND ITS USE

BACKGROUND OF THE INVENTION

1. Field of the Invention

The present invention relates to a polyvinyl acetal, and to an interlayer film for laminated glass, a binder for ceramic forming, a binder for ink or paint and a thermally-processable photographic material that comprise it.

2. Description of the Related Art

It has been known since long ago that polyvinyl acetal is obtained by acetalyzing polyvinyl alcohol with an aldehyde compound under an acidic condition. Polyvinyl alcohol generally has vinyl alcohol units and vinyl ester units. Therefore, polyvinyl acetal obtained through acetalization of such polyvinyl alcohol comprises at least three types of monomer units that include vinyl acetal units in addition to the two types of monomer units of the starting polyvinyl alcohol. Recently, many different types of polyvinyl alcohol have been proposed, and many different types of polyvinyl acetal have been known by combining such different types of polyvinyl alcohol with various types of aldehyde.

Above all, polyvinyl formal to be produced from polyvinyl alcohol and formaldehyde, polyvinyl acetal to be produced from polyvinyl alcohol and acetaldehyde, and polyvinyl butyral to be produced from polyvinyl alcohol and butylaldehyde stand the essential situation in trade.

In particular, polyvinyl butyral is used not only for interlayer films for windowpanes for automobiles and buildings but also in other various industrial fields of binder for ceramic forming, photosensitive materials, dispersant for ink, etc.

Polyvinyl butyral has a hydrophilic hydroxyl group and a hydrophobic butyl acetal group and is therefore hydrophilic and hydrophobic, and it is much used in various fields as above. In particular, the hydroxyl group in the molecule of polyvinyl butyral plays an important role, for example, in the adhesiveness of the polymer to glass and in the binder force thereof to ceramics, but, on the other hand, it causes some problems in that it readily absorbs moisture in air and, when films formed of polyvinyl butyral are stored for a long term, the plasticizer in the films may readily bleed out. Therefore, the polymer is desired to overcome the problems and to satisfy the requirements for it. Specifically, polyvinyl butyral is desired to have improved waterproofness and improved compatibility with plasticizer, still having the advantages intrinsic to it.

Polyvinyl butyral is widely used as interlayer films in laminate glass for windowpanes for automobiles and buildings. These days, however, the demand for further improving the properties of laminate glass is increasing more and more. For example, when laminate glass is exposed to high humidity for a long time, it may face some problems in that water may penetrate into it through its edges and it may whiten as its compatibility with plasticizer is not good. To solve these problems, various proposals have been made. For example, special silicone oil is additionally used (as in JP-A 7-314609), or triethylene glycol di-2-ethylhexanoate is used as a plasticizer (as in WO00/18698). However, the plasticizer, triethylene glycol di-2-ethylhexanoate is problematic in that its application to conventional polyvinyl butyral is limited to only some particular compositions, as so disclosed in JP-T 2001-515527 (the term "JP-T" as used herein means a published Japanese translation of a PCT application).

Using polyvinyl acetal modified with an α-olefin for interlayer films for laminate glass is proposed in, for example, JP-A 63-79741. On the technical level in those days, however, no one has taken the above-mentioned problems into consideration and, at present, therefore, no one has succeeded in solving the problems.

In the field of binder for ceramic forming, polyvinyl acetal is used, for example, as a forming binder in the process of producing ceramic laminate capacitors or producing ceramic substrates for electronic circuits. In particular, polyvinyl acetal is much used as a binder in producing ceramic green sheets.

These days, in particular, precision electric appliances such as mobile phones and notebook-size personal computers are desired to be small-sized and lightweight, and small-sized, electric and electronic parts with a good performance for these are desired.

For example, small-sized, large-capacity ceramic laminate capacitors are desired, for which various methods have been tried for more reducing the thickness of the electrode part or the ceramic part and for further increasing the capacity. From the technical viewpoint, it is a matter of great importance to thin the ceramic green sheets for them. For reducing the thickness of the sheets, ceramic powder having a small particle size must be used as the starting material. However, ceramic powder having such a reduced particle size shall have an increased surface area and will therefore readily aggregate. Accordingly, the ceramic powder of the type causes some problems in that the surface of the ceramic green sheets formed of it is often roughened, homogeneous ceramic green sheets are difficult to obtain, and the mechanical strength of thin sheets is low.

These problems are considered especially serious for small-sized and lightweight electric and electronic appliances that are desired these days. For example, JP-A 63-79752 discloses some examples of α-olefin-modified polyvinyl acetal. On the technical level in those days, however, no one has taken the above-mentioned problems into consideration and, at present, therefore, no one has succeeded in solving the problems.

In the paint field of its industrial applications, polyvinyl acetal is used for paint for automobiles, baking enamel, shop primer, wash primer, adhesive lacquer, insulating coat on tar or nicotine, paint for plastics, nitrocellulose lacquer, paper varnish, etc. For binder for printing ink for wrapping or packaging materials, used is polyvinyl butyral of low solution viscosity. The printing ink that comprises the polymer well adheres to organic and inorganic substrates and is therefore suitable for prints on polyolefin films, metal foil, cellulose acetate films, polyamide films and polystyrene films.

These days, in particular, printers are driven at high speed in many cases. Therefore, for realizing such high-speed driving of printers, it is said that the printing ink must have a high pigment content at its desired viscosity, and, even if the printed ink film is thin, the print color intensity must be high. In general, for increasing the pigment content of printing ink, it is important to lower the solution viscosity thereof. For lowering the solution viscosity of printing ink, use of polyvinyl acetal having a low degree of polymerization may be taken into consideration. However, using polyvinyl acetal of low polymerization, which is produced through acetalization of completely hydrolyzed polyvinyl alcohol, is problematic in that the aqueous solution of the polyvinyl acetal readily gels and the pigment content of ink with the polymer could not increase.

To solve these problems, for example, proposed are a method of using polyvinyl butyral produced from polyvinyl alcohol having a specific degree of hydrolysis (as in JP-A 11-349889), and a method of using polyvinyl acetal produced from polyvinyl alcohol having 1-alkylvinyl alcohol units and 1-alkylvinyl acetate units (as in JP-T 2000-503341). These methods may be effective in some degree for solving the problems as above, but could not always lead to satisfactory results.

Thermally-developable photographic materials are now in practical use for X-ray photographs in the field of medical therapy, since they may be simply processed for development not producing any excess chemical wastes, as compared with conventional, wet-processable silver halide photographic materials. Such thermally-developable photographic materials may be fabricated by applying an organic silver salt, a reducing agent and a silver halide that is kept in catalytic contact with organic silver ions, on a support such as plastic film by the use of a film-forming binder such as polyvinyl acetal.

The thermally-developable photographic materials of the type have some problems in that the storage stability of the coating liquids to be used in fabricating them is often poor, the sensitivity of the photographic materials themselves is often not so good and the storage stability of the images formed after development is often poor. To solve these problems, for example, a method of using polyvinyl acetal that has a specific ionic group (JP-A 2001-222089) and a method of combining two different types of polyvinyl acetal each having a specific degree of polymerization (JP-A 2002-201215) have been proposed. At present, however, these method could not satisfactorily solve the problems as above.

SUMMARY OF THE INVENTION

An object of the invention is to provide a polyvinyl acetal having improved waterproofness and improved compatibility with plasticizer and still having the properties characteristic of the polymer, and provides an interlayer film for laminated glass, laminated glass with the interlayer film, a binder for ceramic forming, a binder for ink or paint and a thermally-processable photographic material that comprise it.

We, the present inventors have assiduously studied for attaining the object as above, and, as a result, have found that it can be attained by a polyvinyl acetal that starts from a specific polyvinyl alcohol. On the basis of this finding, we have completed the present invention.

Specifically, the first aspect of the invention is a polyvinyl acetal having a degree of acetalization of from 45 to 80mol %, which is obtained through acetalization of a polyvinyl alcohol that contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %.

The second aspect of the invention is an interlayer film for safety glass, which comprises, as the essential ingredient, a polyvinyl acetal having a degree of acetalization of from 45 to 80 mol % and obtained through acetalization of a polyvinyl alcohol that contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %.

The third aspect of the invention is laminate glass that comprises the interlayer film for safety glass of the second aspect of the invention.

The fourth aspect of the invention is a binder for ceramic forming, which comprises a polyvinyl acetal having a degree of acetalization of from 45 to 80 mol % and obtained through acetalization of a polyvinyl alcohol that contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %.

The fifth aspect of the invention is a binder for ink or paint, which comprises a polyvinyl acetal having a degree of acetalization of from 45 to 80 mol % and obtained through acetalization of a polyvinyl alcohol that contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %.

The sixth aspect of the invention is a thermally-developable photographic material, which comprises a polyvinyl acetal having a degree of acetalization of from 45 to 80 mol % and obtained through acetalization of a polyvinyl alcohol that contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %.

DESCRIPTION OF THE PREFERRED EMBODIMENTS

The polyvinyl acetal of the invention is obtained through acetalization of a polyvinyl alcohol which contains α-olefin units and 1,2-glycol in a specific ratio and which is specifically defined by its degree of polymerization and its degree of hydrolysis, and its advantages are that it is well balanced in point of its hydrophilicity and hydrophobicity, its waterproofness is good and its compatibility with plasticizer is good.

The interlayer film for laminated glass of the invention comprises, as the essential ingredient, the polyvinyl acetal of the type, and its advantages are that its adhesiveness to glass sheets to be laminated and its whitening resistance at the edges of laminated glass is good.

The binder for ceramic forming of the invention makes it possible to produce homogeneous ceramic green sheets having a high mechanical strength even when ceramic powder having a small particle size is used as the starting material for thinned ceramic green sheets.

The binder for ink or paint of the invention makes it possible to produce ink or paint that has a lowered solution viscosity and an increased solid content (that is, an increased pigment content) and has good ink dispersibility.

The advantages of the thermally-developable photographic material of the invention are that the storage stability of the coating liquids for it is good, its sensitivity in development is good and the storage stability of the image formed thereon through development is good.

In the invention, the polyvinyl acetal is produced through acetalization of a polyvinyl alcohol which contains from 1 to 15 mol % of α-olefin units and has a 1,2-glycol bond content of from 1 to 3 mol %, a degree of polymerization of from 100 to 2000 and a degree of hydrolysis of from 80.0 to 99.99 mol %.

The polyvinyl alcohol (hereinafter abbreviated as "PVA") to be used for producing the polyvinyl acetal of the invention must have a degree of polymerization of from 100 to 2000. If the degree of polymerization of PVA is smaller than 100, PVA of the type is difficult to produce on an industrial scale. If the degree of polymerization of PVA is larger than 2000, the solubility thereof in water will lower and polyvinyl acetal will be difficult to produce from it.

When the polyvinyl acetal of the invention is used for interlayer films for laminated glass, the degree of polymerization of PVA for it is preferably from 500 to 2000, more preferably from 800 to 1900, even more preferably from 1000 to 1700. If the degree of polymerization of PVA is smaller than 500, the mechanical strength of the interlayer film for laminated glass, formed of the polyvinyl acetal from PVA of the type, may be low. If the degree of polymerization of PVA is larger than 2000, the viscosity of the polyvinyl acetal from PVA of the type will increase and the moldability thereof may be poor.

When the polyvinyl acetal of the invention is used for binders for ceramic forming, the degree of polymerization of PVA for it is preferably from 200 to 2000, more preferably from 300 to 1700, even more preferably from 500 to 1500, still more preferably from 700 to 1200. If the degree of polymerization of PVA is smaller than 200, the mechanical strength of the ceramic green sheets produced by the use of the binder may be low. If the degree of polymerization of PVA is larger than 2000, the viscosity of the slurry for ceramic forming, which is prepared in producing ceramic green sheets, will increase and the moldability thereof may be poor.

When the polyvinyl acetal of the invention is used for binders for ink or paint, the degree of polymerization of PVA for it is preferably from 100 to 700, more preferably from 130 to 600, even more preferably from 180 to 550. If the degree of polymerization of PVA is smaller than 100, PVA of the type will be difficult to produce on an industrial scale. Even when PVA having a degree of polymerization of smaller than 100 could be produced, the polyvinyl acetal from it could not satisfactorily exhibit the function for binders for ink or paint. If the degree of polymerization of PVA is larger than 700, ink or paint having a low solution viscosity and a high solid content (high pigment content) will be difficult to produce.

When the polyvinyl acetal of the invention is used in thermally-developable photographic materials, the degree of polymerization of PVA for it is preferably from 100 to 1700, more preferably from 130 to 1500, even more preferably from 200 to 1000. If the degree of polymerization of PVA is smaller than 100, PVA of the type will be difficult to produce on an industrial scale. Even when PVA having a degree of polymerization of smaller than 100 could be produced, it could not give thermally-developable photographic materials having the intended properties. If the degree of polymerization of PVA is larger than 1700, the dispersibility of an organic silver salt in the polyvinyl acetal from PVA of the type will be poor in producing thermally-developable photographic materials and, in addition, the viscosity of the coating liquids for the materials will be too high and the coatability thereof will be poor.

In the invention, the degree of polymerization of PVA means a viscosity-average degree of polymerization thereof, and it is measured according to JIS-K6726. Concretely, PVA is hydrolyzed to a degree of hydrolysis of at least 99.5 mol %, and purified, and its degree of polymerization is derived from the intrinsic viscosity [η] thereof measured in water at 30° C., according to the following equation:

$$P=([\eta]\times 1000/8.29)^{(1/0.62)}$$

PVA to be the starting material for the polyvinyl acetal of the invention must have a degree of hydrolysis of from 80.0 to 99.99 mol %. PVA having a degree of hydrolysis of lower than 80 mol % is unfavorable since its solubility in water is low and polyvinyl acetal is difficult to produce from it; and PVA having a degree of hydrolysis of higher than 99.99 mol % is difficult to produce.

When the polyvinyl acetal of the invention is used for interlayer films for laminated glass, the degree of hydrolysis of PVA for it is preferably from 85 to 99.99 mol %, more preferably from 90 to 99.5 mol %, even more preferably from 92 to 99.2 mol %. If the degree of hydrolysis of PVA is smaller than 85 mol %, the compatibility of the polyvinyl acetal from PVA of the type with plasticizer will lower, or the whitening resistance of laminated glass with the polyvinyl acetal at the edges thereof will be poor.

When the polyvinyl acetal of the invention is used for binders for ceramic forming, the degree of hydrolysis of PVA for it is preferably from 85 to 99.99 mol %, more preferably from 90 to 99 mol %, even more preferably from 92 to 98.5 mol %. If the degree of hydrolysis of PVA is smaller than 85 mol %, the ceramic green sheets obtained by the use of the binder for forming ceramics could not be homogeneous.

When the polyvinyl acetal of the invention is used for binders for ink or paint, the degree of hydrolysis of PVA for it is preferably from 80 to 99.99 mol %, more preferably from 90 to 99 mol %, even more preferably from 92 to 98.5 mol %. If the degree of hydrolysis of PVA is smaller than 80.0 mol %, the solubility thereof in water will be low and polyvinyl acetal will be difficult to produce from PVA of the type. Even when polyvinyl acetal of the type could be produced, it could not give ink or paint having a low solution viscosity and a high solid content (high pigment content).

When the polyvinyl acetal of the invention is used in thermally-developable photographic materials, the degree of hydrolysis of PVA for it is preferably from 80 to 99.99 mol %, more preferably from 85 to 99.5 mol %, even more preferably from 88 to 99 mol %. If the degree of hydrolysis of PVA is smaller than 80 mol %, the solubility thereof in water will be low and polyvinyl acetal will be difficult to produce from PVA of the type. Even when polyvinyl acetal of the type could be produced, it is unfavorable for thermally-developable photographic materials since it may worsen the image stability and the thermal stability of the developed materials.

PVA to be the starting material for the polyvinyl acetal of the invention must contain from 1 to 15 mol % of α-olefin units. If the α-olefin unit content of PVA is smaller than 1 mol %, the waterproofness of the polyvinyl acetal obtained from PVA of the type will be poor or the compatibility of the polyvinyl acetal with plasticizer will be low. If the α-olefin unit content of PVA is larger than 15 mol %, the solubility thereof in water will be poor and polyvinyl acetal will be difficult to produce from PVA of the type.

When the polyvinyl acetal of the invention is used for interlayer films for laminated glass, the α-olefin unit content of PVA for it is preferably from 1 to 15 mol %, more preferably from 2 to 10 mol %, even more preferably from 3 to 7 mol %. If the α-olefin unit content of PVA is smaller than 1 mol %, the adhesiveness of polyvinyl acetal from PVA of the type to glass sheets will be low, and the compatibility of the polyvinyl acetal with plasticizer will also be low or the whitening resistance of the edges of laminated glass that comprises the polyvinyl acetal will be low.

When the polyvinyl acetal of the invention is used for binders for ceramic forming, the α-olefin unit content of PVA for it is preferably from 1 to 15 mol %, more preferably from 2 to 10 mol %, even more preferably from 3 to 7 mol %. If the α-olefin unit content of PVA is smaller than 1 mol % and if polyvinyl acetal from PVA of the type is used as a binder for ceramic green sheets, then the surface condition of the ceramic green sheets produced will be poor and the mechanical strength of the sheets will be low.

When the polyvinyl acetal of the invention is used for binders for ink or paint, the α-olefin unit content of PVA for it is preferably from 1 to 15 mol %, more preferably from 1.5 to 10 mol %, even more preferably from 2 to 8 mol %. If the α-olefin unit content of PVA is smaller than 1 mol %, then ink or paint having a low solution viscosity and having a high solid content (high pigment content) will be difficult to produce by the use of the polyvinyl acetal from PVA of the type.

When the polyvinyl acetal of the invention is used in thermally-developable photosensitive materials, the α-olefin unit content of PVA for it is preferably from 1 to 15 mol %, more preferably from 1.5 to 10 mol %, even more preferably from 2 to 8 mol %. If the α-olefin unit content of PVA is smaller than 1 mol %, it is unfavorable since the storage stability of the coating liquids for producing thermally-developable photographic materials will be low, the thermal developability of the photographic materials will be low, and the image stability and the thermal stability of the developed materials will be low.

The α-olefin units for PVA include, for example, linear α-olefins having at most 10 carbon atoms such as ethylene, propylene, 1-butene, 1-pentene, 1-hexene, 1-heptene, 1-octene, 1-nonene, 1-decene; and branched α-olefins having at most 10 carbon atoms such as isobutene. Of those, preferred are α-olefins having at most 4 carbon atoms, and more preferred is ethylene.

The amount of the α-olefin units in PVA may be obtained, for example, according to the methods mentioned below.

(1) A PVA precursor, polyvinyl ester with α-olefin units is well re-precipitated and purified in n-hexane/acetone repeatedly at least 3 times, and then dried at 80° C. under reduced pressure for 3 days to prepare a sample for analysis. For example, when the type of the α-olefin units in PVA is ethylene, the sample for analysis is dissolved in DMSO-d6 and its proton NMR is measured at 80° C. The ethylene content of PVA is calculated from the peak (4.7 to 5.2 ppm) derived from the main chain methine of vinyl ester and the peak (0.8 to 1.6 ppm) derived from the main chain methylene of ethylene and vinyl ester.

(2) PVA is heated in pyridine/acetic anhydride to thereby acetylate the hydroxyl group in PVA. Then, this is well re-precipitated and purified in water/acetone, and then dried at 80° C. under reduced pressure for 3 days to prepare a sample for analysis. The α-olefin unit content of the sample is obtained in the same manner as in (1).

(3) Polyvinyl acetal is reacted with hydroxylamine hydrochloride in an alcohol solvent, and the resulting reaction product is well re-precipitated and purified in water/alcohol to give PVA. Thus obtained, PVA is heated in pyridine/acetic an hydride to thereby acetylate the hydroxyl group therein. Then, this is well re-precipitated and purified in water/acetone, and then dried at 80° C. under reduced pressure for 3 days to prepare a sample for analysis. The α-olefin unit content of the sample is obtained in the same manner as in (1).

In the invention, PVA must contain from 1 to 3 mol % of 1,2-glycol bond. If the 1,2-glycol bond content of PVA is smaller than 1 mol %, then the compatibility of the polyvinyl acetal from PVA of the type with plasticizer may below; and if the 1,2-glycol bond content is larger than 3 mol %, the compatibility of the polyvinyl acetal with plasticizer may be also low.

When the polyvinyl acetal of the invention is used for interlayer films for laminated glass and if the 1,2-glycol bond content of PVA for it is smaller than 1 mol %, then the compatibility of the polyvinyl acetal from PVA of the type with plasticizer may be low and the adhesiveness of the interlayer film to glass sheets to be laminated with it may also be low. On the other hand, if the 1,2-glycol bond content of PVA is larger than 3 mol %, the waterproofness of the polyvinyl acetal from PVA of the type may be low or the compatibility of the polyvinyl acetal with plasticizer may also be low.

When the polyvinyl acetal of the invention is used for binders for ceramic forming and if the 1,2-glycol bond content of PVA for it is smaller than 1 mol %, then the surface condition of ceramic green sheets to be obtained with it may worsen or the mechanical strength of the ceramic green sheets may lower. If the 1,2-glycol bond content of PVA is larger than 3 mol %, the surface condition of the ceramic green sheets may also worsen or the mechanical strength thereof may lower.

When the polyvinyl acetal of the invention is used for binders for ink or paint and if the 1,2-glycol bond content of PVA for it is smaller than 1 mol %, then ink or paint having a low solution viscosity and a high solid content (high pigment content) will be difficult to produce. If the 1,2-glycol bond content of PVA is larger than 3 mol %, then ink or paint having a low solution viscosity and a high solid content (high pigment content) will also be difficult to produce.

When the polyvinyl acetal of the invention is used in thermally-developable photographic materials and if the 1,2-glycol bond content of PVA for it is smaller than 1 mol %, then the storage stability of coating liquid for the materials will be poor; and if the 1,2-glycol bond content of PVA is larger than 3 mol %, the image stability of developed materials will be poor.

For controlling the 1,2-glycol bond content of PVA, employable is a method of controlling the polymerization temperature in producing polyvinyl ester through copolymerization of a vinyl ester monomer such as vinyl acetate and any other monomer, or copolymerizing a vinyl ester monomer with some other monomer such as vinylene carbonate.

In the invention, PVA preferably satisfies the following formula (1). This is because the polyvinyl acetal obtained from PVA of the type has better waterproofness and its compatibility with plasticizer is better. When the polyvinyl acetal obtained from PVA that satisfies the following formula (1) is used for interlayer films for laminated glass, for binders for ceramic forming or for binders for ink or paint, or in thermally-developable photographic materials, then it produces better results.

$$-0.012 \times Fn + 1.24 \leq \text{content (mol \%)} \leq -0.022 \times Fn + 2.23 \qquad (1)$$

wherein the content (mol %) means the 1,2-glycol bond content of PVA; and Fn means the α-olefin unit content (mol %) of PVA.

In the invention, the 1,2-glycol bond content of PVA may be obtained from the peaks in NMR. Concretely, PVA is hydrolyzed to a degree of hydrolysis of at least 99.9 mol %, then fully washed with methanol, and then dried at 90° C. under reduced pressure for 2 days to prepare a sample for analysis. The sample is dissolved in DMSO-D6, some drops of trifluoroacetic acid are added thereto, and the resulting sample is subjected to 500 MHz proton NMR (with JEOL GX-500) at 80° C. From the peak derived from methine of vinyl alcohol unit (3.2 to 4.0 ppm, integral value A) and from the peak derived from one methine of 1,2-glycol bond (3.25 ppm, integral value B), the 1,2-glycol bond content of PVA is calculated according to the equation mentioned below.

1,2-Glycol bond content (mol %)=$B\times(100-Et)/100A$ wherein Et indicates a degree of ethylene modification (mol %) of PVA.

The 1,2-glycol bond content of PVA may also be obtained from polyvinyl acetal. In this case, polyvinyl acetal is reacted with hydroxylamine hydrochloride in an alcohol solvent, and the resulting reaction product is fully re-precipitated and purified in water/alcohol to give PVA. After this, the resulting PVA is processed to prepare a sample for analysis thereof in the same manner as above.

Preferably, PVA to be the starting material for the polyvinyl acetal of the invention contains from 0.02 to 5 mol % of carboxylic acid and lactone ring. In this case, the carboxylic acid includes its alkali metal salts, and the alkali metal includes potassium and sodium.

When PVA in which the content of carboxylic acid and lactone ring is smaller than 0.02 mol % and when polyvinyl acetal from PVA of the type is used, for example, for binders for ink or paint, then ink and paint having a low solution viscosity and a high solid content (high pigment content) will be difficult to produce. When PVA in which the content of carboxylic acid and lactone ring is larger than 5 mol % and when the solid content (pigment content) of ink and paint is increased, then the solution viscosity of ink and paint could not be lowered and the durability of ink and paint may be low. When polyvinyl acetal is in binders for ink and paint, the amount of the carboxylic acid and lactone ring to be in PVA for it is preferably from 0.022 to 4 mol %, more preferably from 0.024 to 3 mol %, even more preferably from 0.025 to 2 mol %.

In the invention, PVA preferably satisfies the following formula (2). This is because the polyvinyl acetal obtained from PVA of the type has much better waterproofness and its compatibility with plasticizer is much better. When the polyvinyl acetal obtained from PVA that satisfies the following formula (2) is used for interlayer films for laminated glass, for binders for ceramic forming or for binders for ink or paint, or in thermally-developable photographic materials, then it produces much better results.

$-1.95\times10^{-5}\times P+0.045 \leq$ content (mol %) $\leq -1.38\times10^{-4}\times P+0.91$ (2)

wherein the content (mol %) means the content of carboxylic acid and lactone ring in PVA; and P indicates the viscosity-average degree of polymerization of PVA.

For producing PVA with such carboxylic acid and lactone ring, for example, employable is (i) a method of hydrolyzing polyvinyl ester, which is prepared through copolymerization of a vinyl ester monomer such as vinyl acetate and a monomer having the ability to produce carboxylic acid and lactone ring, in a solution of alcohol or dimethylsulfoxide; (ii) a method of polymerizing a vinyl ester monomer in the presence of a carboxylic acid-having thiol compound such as mercaptoacetic acid or 3-mercaptopropionic acid, followed by hydrolyzing the resulting polyvinyl ester; (iii) a method of polymerizing a vinyl ester monomer such as vinyl acetate with chain transfer to the alkyl group of the vinyl ester monomer and the polyvinyl ester, followed by hydrolyzing the resulting highly-branched polyvinyl ester; (iv) a-method of reacting a copolymer of an epoxy group-having monomer and a vinyl ester monomer with a carboxyl group-having thiol compound, followed by hydrolyzing the resulting product; or (v) a method of acetalyzing PVA with a carboxyl group-having aldehyde.

The vinyl ester monomer includes, for example, vinyl formate, vinyl acetate, vinyl propionate, vinyl valerate, vinyl caprate, vinyl laurate, vinyl stearate, vinyl benzoate, vinyl pivalate and vinyl versatate. Of those, preferred is vinyl acetate for obtaining PVA.

The monomer having the ability to produce carboxylic acid and lactone ring includes, for example, monomers with a carboxyl group derived from any of fumaric acid, maleic acid, itaconic acid, maleic anhydride or itaconic anhydride; acrylic acid and its salts, and acrylates such as methyl acrylate, ethyl acrylate, n-propyl acrylate and i-propyl acrylate; methacrylic acid and its salts, and methacrylates such as methyl methacrylate, ethyl methacrylate, n-propyl methacrylate and i-propyl methacrylate; acrylamide, and acrylamide derivatives such as N-methylacrylamide and N-ethylacrylamide; methacrylamide, and methacrylamide derivatives such as N-methylmethacrylamide and N-ethylmethacrylamide.

The content of carboxylic acid and lactone ring in PVA may be obtained from the peaks of the proton NMR pattern of PVA. Concretely, PVA is hydrolyzed to a degree of hydrolysis of at least 99.95 mol %, then well washed with methanol, and dried under reduced pressure at a temperature of 90° C. for 2 days to prepare a PVA sample for analysis. Depending on the production methods of PVA, (i) to (v), the sample is analyzed according to the methods mentioned below.

In Case of Method (i):

The PVA sample for analysis is dissolved in DMSO-d6, and it is analyzed at 60° C. through proton NMR. The monomer content of acrylic acid, acrylates, acrylamide, acrylamide derivatives and the like is calculated in an ordinary manner from the peak (2.0 ppm) derived from the main chain methine; and the monomer content of methacrylic acid, methacrylates, methacrylamide, methacrylamide derivatives and the like is from the peak (0.6 to 1.1 ppm) derived from the methyl group directly bonding to the main chain. The monomer with a carboxyl group derived from fumaric acid, maleic acid, itaconic acid, maleic anhydride, itaconic anhydride or the like is determined as follows: The PVA sample for analysis in dissolved in DMSO-d6, some drops of trifluoroacetic acid are added thereto, and this is analyzed at 60° C. through proton NMR. The monomer content may be calculated in an ordinary manner from the methine peak of the lactone ring (4.6 to 5.2 ppm).

In Case of Methods (ii) and (iv):

The content of carboxylic acid and lactone ring in PVA may be calculated from the peak (2.8 ppm) derived from the methylene that bonds to the sulfur atom.

In Case of Method (iii):

The PVA sample for analysis is dissolved in methanol-d4/$D_2O$=⅖, and it is analyzed at 80° C. through proton NMR. The terminal carboxylic acid or its alkali metal salt methylene-derived peaks (structural formula 1 and structural formula 2 mentioned below) are assigned to 2.2 ppm (integral value A) and 2.3 ppm (integral value B); the terminal lactone ring methylene-derived peak (structural formula 3 mentioned below) to 2.6 ppm (integral value C); and the vinyl alcohol unit methine-derived peak to 3.5 to 4.15 ppm (integral value D). The content of carboxylic acid and lactone ring in PVA is calculated according to the following equation:

Content of carboxylic acid and lactone ring (mol %)=50×(A+B+C)×(100−Fn)/(100×D)

wherein Fn indicates the degree of α-olefin modification (mol %) of PVA.

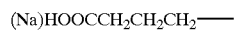
(Structural formula 1)

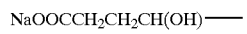
(Structural formula 2)

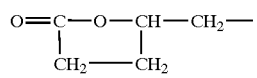
(Structural formula 3)

In Case of (v):

The PVA sample for analysis is dissolved in DMSO-d6, and it is analyzed at 60° C. through proton NMR. The content in question in PVA may be calculated in an ordinary manner, based on the peak, 4.8 to 5.2 ppm that is derived from the methine (structural formula 4 mentioned below) in the acetal moiety.

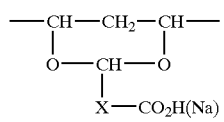
(Structural formula 4)

wherein X indicates a single bond or an alkyl residue having from 1 to 10 carbon atoms.

Not detracting from the advantages of the invention, PVA for use in the invention may contain any other monomer units than vinyl alcohol units, α-olefin units, vinyl ester units and the above-mentioned monomer units having the ability to produce carboxylic acid and lactone ring. The additional monomer units include those derived from various monomer units, for example, N-vinylamides such as N-vinylacetamide, N-vinylpyrrolidone, N-vinylcaprolactam; vinyl ethers such as methyl vinyl ether, ethyl vinyl ether, n-propyl vinyl ether, i-propyl vinyl ether, n-butyl vinyl ether; hydroxyl group-having vinyl ethers such as ethylene glycol vinyl ether, 1,3-propanediol vinyl ether, 1,4-butanediol vinyl ether; allyl acetate, allyl ethers such as propyl allyl ether, butyl allyl ether, hexyl allyl ether; oxyalkylene group-having monomers; vinylsilanes such as vinyltrimethoxysilane; hydroxyl group-having α-olefins such as isopropenyl acetate, 3-buten-1-ol, 4-penten-1-ol, 5-hexen-1-ol, 7-octen-1-ol, 9-decen-1-ol, 3-methyl-3-buten-1-ol; monomers with a sulfonic acid group derived from ethylenesulfonic acid, allylsulfonic acid, methallylsulfonic acid, 2-acrylamido-2-methylpropanesulfonic acid or the like; and monomers with a cationic group derived from vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine, allylethylamine or the like. The content of the additional monomer units in PVA is generally at most 20 mol %, preferably at most 10 mol %, more preferably at most 5 mol %.

PVA for use in the invention may be a terminal-modified PVA derivative that is obtained by copolymerizing a vinyl ester monomer such as vinyl acetate with ethylene in the presence of a thiol compound excluding the above-mentioned carboxylic acid-having mercaptans, such as 2-mercaptoethanol or n-dodecylmercaptan, followed by hydrolyzing the resulting polyvinyl ester.

Copolymerization of vinyl ester monomer with α-olefin monomer may be effected in any known manner of, for example, bulk polymerization, solution polymerization, suspension polymerization or emulsion polymerization. Of those, generally employed is bulk polymerization of polymerizing the monomers in the absence of a solvent or solution polymerization of polymerizing them in a solvent such as alcohol. The alcohol that serves as a solvent in solution polymerization is, for example, a lower alcohol such as methyl alcohol, ethyl alcohol or propyl alcohol. The initiator for copolymerization includes, for example, azo initiators such as α,α'-azobisisobutyronitrile, 2,2'-azobis (2,4-dimethyl-valeronitrile); and peroxide initiators such as benzoyl peroxide, n-propyl peroxycarbonate. Though not specifically defined, the polymerization temperature is generally between 0° C. and 150° C., preferably between 30° C. and 120° C., more preferably between 40° C. and 80° C.

The polyvinyl ester thus obtained through copolymerization of α-olefin with vinyl ester monomer is then hydrolyzed in a solution of alcohol or dimethylsulfoxide according to a known method.

In hydrolyzing the polyvinyl ester, an alkaline substance such as potassium hydroxide or sodium hydroxide is used for the catalyst. Preferably, the molar ratio of the alkaline substance falls between 0.004 and 0.5 to the vinyl ester units of the polymer, more preferably between 0.005 and 0.05. The alkaline substance may be added to the system in the initial stage of hydrolysis all at a time, or may be intermittently added thereto during hydrolysis.

The solvent to be used in hydrolysis of polyvinyl ester includes, for example, methanol, methyl acetate, dimethylsulfoxide and dimethylformamide. Of those solvents, preferred is methanol. Preferably, the water content of methanol to be used for the solvent is controlled to fall between 0.001 and 1% by weight, more preferably between 0.003 and 0.9% by weight, even more preferably between 0.005 and 0.8% by weight.

In hydrolyzing the polyvinyl ester, the polymer concentration is preferably controlled to fall between 10 and 70%, more preferably between 20 and 65%. The temperature in hydrolysis preferably falls between 5 and 80° C., more preferably between 20 and 70° C. The time for hydrolysis preferably falls between 5minutes and 10 hours, more preferably between 10 minutes and 5 hours. To hydrolysis of polyvinyl ester, applicable is any known batch process or continuous process.

PVA thus obtained through hydrolysis of polyvinyl ester is then washed. The washing liquid usable for it includes, for example, methanol, acetone, methyl acetate, hexane and water. Of those, preferred are methanol, methyl acetate and water, which may be used singly or as a mixture of any of them.

Preferably, the amount of the washing liquid to be used generally falls between 2 and 10000 parts by weight, more preferably between 3 and 3000 parts by weight relative to 100 parts by weight of PVA. The temperature in washing preferably falls between 5 and 80° C., more preferably between 20 and 70° C. The time for washing preferably falls between 20 minutes and 10 hours, more preferably between 1hour and 6 hours. For washing PVA, employable is any known batch process or countercurrent cascade process.

PVA thus produced and washed according to the method as above is acetalized into polyvinyl acetal under an acidic condition in an aqueous solvent according to a known method. The polyvinyl acetal thus obtained herein has a degree of acetalization of from 45 to 80 mol %, preferably from 50 to 80 mol %, more preferably from 60 to 80 mol %.

Polyvinyl acetal of which the degree of acetalization is lower than 45 mol % is unfavorable since the powdery reaction product obtained through acetalization will be difficult to recover and since the waterproofness of the polyvinyl acetal obtained will be low or the compatibility of polyvinyl acetal with plasticizer will be low.

In addition, when the degree of acetalization of polyvinyl acetal is lower than 45 mol % and when the polyvinyl acetal of the type is used for interlayers for laminated glass, then the whitening resistance of the laminated glass at the edges thereof will lower at high humidity; and when it is used for binders for ceramic forming, then the surface condition of the ceramic green sheets produced will worsen or the mechanical strength of the ceramic green sheets will lower.

When the degree of acetalization of polyvinyl acetal is lower than 45 mol % and when the polyvinyl acetal of the type is used for binders for ink or paint, then ink and paint having a low solution viscosity and a high solid content (high pigment content) will be difficult to produce. In the case, in addition, the films formed of the ink or paint may be problematic in point of the durability thereof.

When the degree of acetalization of polyvinyl acetal is lower than 45 mol % and when the polyvinyl acetal of the type is used in thermally-developable photographic materials, then the storage stability of the coating liquids for the materials will be poor, the sensitivity in development of the materials will be low and the image stability of the developed materials may also be low.

On the other hand, when the degree of acetalization of polyvinyl acetal is higher than 80 mol %, the polyvinyl acetal of the type will be difficult to produce, and its compatibility with plasticizer may lower. When it is used for interlayer films for laminated glass, then the whitening resistance of the laminated glass at its edges will be low at high humidity. When it is used for binders for ceramic forming, then the surface condition of the ceramic green sheets produced may worsen.

For acetalization of PVA, for example, employable is (a) a method that comprises dissolving PVA in water under heat to prepare an aqueous PVA solution having a concentration of from 5 to 30%, cooling it to a temperature falling between 5 and 50° C., adding thereto a predetermined amount of aldehyde, then further cooling it to a temperature falling between −10 and 30° C., and controlling the pH of the aqueous solution to be at most 1 by adding acid thereto to thereby initiate acetalization of PVA; or (b) a method that comprises dissolving PVA in water under heat to prepare an aqueous PVA solution having a concentration of from 5 to 30%, cooling it to a temperature falling between 5 and 50° C., controlling the pH of the aqueous solution to be at most 1 by adding acid thereto, then further cooling it to a temperature falling between −10 and 30° C., and adding thereto a predetermined amount of aldehyde to thereby initiate acetalization of PVA.

The time for acetalization generally falls between 1 and 10 hours or so, and the reaction is preferably effected with stirring. In case where the degree of acetalization of the polyvinyl acetal prepared according to the above-mentioned acetalization method could not increase, the reaction may be further continued at an elevated temperature falling between 50 and 80° C. or so.

The powdery reaction product obtained through the acetalization is taken out through filtration, neutralized with an aqueous alkali solution, then washed with water and dried to obtain the intended polyvinyl acetal.

The aldehyde compound to be used for the acetalization includes, for example, formaldehyde, acetaldehyde, propionaldehyde, butylaldehyde, hexylaldehyde and benzaldehyde. These may be used singly or as a mixture of two or more of them. Preferred examples of the aldehyde compounds are alkylaldehydes having at most 4 carbon atoms and benzaldehyde, and butylaldehyde is more preferred.

If desired, a carboxylic acid-containing aldehyde compound may be used along with the aldehyde compound as above.

The acid to be used in acetalization is generally an inorganic acid such as hydrochloric acid, sulfuric acid or nitric acid, or an organic acid such as p-toluenesulfonic acid. These acids may be used singly or as a mixture of two or more of them. The alkali compound to be used for neutralizing the powdery reaction product obtained after the acetalization includes, for example, alkali metal hydroxides such as sodium hydroxide and potassium hydroxide, as well as amine compounds such as ammonia, triethylamine and pyridine.

When the polyvinyl acetal of the invention is used for interlayer films for laminated glass, a plasticizer may be added to it. The plasticizer usable herein includes, for example, triethylene glycol di-2-ethylhexanoate, oligoethylene glycol di-2-ethylhexanoate, tetraethylene glycol di-n-heptanoate. Its amount to be added may be from 20 to 100 parts by weight, preferably from 30 to 50 parts by weight relative to 100 parts by weight of the polyvinyl acetal. If the amount of the plasticizer added is smaller than 20 parts by weight, the interlayer films formed for laminated glass will be too tough and they could not be readily cut. However, if the amount thereof is larger than 100 parts by weight, the plasticizer may bleed out.

For controlling the adhesiveness between the interlayer film and glass sheets to be laminated, any known metal salt of a carboxylic acid having from 2 to 10 carbon atoms may be added to the polyvinyl acetal. The metal salt includes alkali metal salts and alkaline earth metal salts with, for example, sodium, potassium or magnesium. The amount of the metal salt of a carboxylic acid having from 2 to 10 carbon atoms that may be added to the polyvinyl acetal is preferably from 1 to 200 ppm, more preferably from 10 to 150 ppm.

If desired, the polyvinyl acetal of the invention may contain any known ordinary additives such as UV absorbent, light stabilizer, antioxidant, surfactant, colorant.

For producing interlayer films for laminated glass by the use of the polyvinyl acetal of the invention, for example, employable is a method of adding a predetermined amount of plasticizer and any other additive to polyvinyl acetal, uniformly kneading them and shaping the resulting mixture into sheets in a mode of extrusion, calendering, pressing, casing or inflation.

The thickness of the interlayer film for laminated glass may fall generally between 0.3 and 1.6 mm, and the interlayer film may have a single-layered structure or a laminated structure of two or more layers.

Methods of using the interlayer films formed of the polyvinyl acetal of the invention in producing laminated glass are not specifically defined herein. For example, the interlayer film is sandwiched between two transparent glass sheets, and this is put into a rubber bag, pre-bonded together under reduced pressure for suction at a temperature of about 70 to 110° C., and then finally bonded in an autoclave at a temperature of about 120 to 150° C. under a pressure of about 1 to 1.5 MPa. The process gives the intended laminated glass.

The sheet glass to be used for the laminated glass is not specifically defined, including, for example, inorganic transparent sheet glass such as float sheet glass, polished sheet glass, die plate glass, meshed sheet glass, wired sheet glass, heat ray-absorbent sheet glass, colored sheet glass; and organic transparent plastic sheets such as polycarbonate sheets, polymethyl methacrylate sheets.

When the polyvinyl acetal of the invention is used for binders for ceramic forming and when ceramic powder is molded with it, an organic solvent is generally used, and, if desired, a plasticizer may also be used along with it. Examples of the organic solvent are alcohols such as methanol, ethanol, isopropanol, n-propanol, butanol; cellosolves such as methyl cellosolve, butyl cellosolve; ketones such as acetone, methyl ethyl ketone; aromatic hydrocarbons such as toluene, xylene; and halogenohydrocarbons such as dichloromethane, chloroform. One or more of these may be used herein either singly or as combined.

Examples of the plasticizer are tri or tetraethylene glycol dicarboxylates such as triethylene glycol di-2-ethylhexanoate, tetraethylene glycol di-2-ethylhexanoate, triethylene glycol di-n-heptanoate, tetraethylene glycol di-n-heptanoate; and dicarboxylates such as dioctyl adipate, dibutyl adipate, dioctyl phthalate, dibutyl phthalate. One or more of these may be used herein either singly or as combined.

The ceramic powder may be powder of metal or non-metal oxide or non-oxide for production of ceramics. Its examples are oxides, carbides, nitrides, borides and sulfides with any of Li, K, Mg, B, Al, Si, Cu, Ca, Sr, Ba, Zn, Cd, Ga, In, Y, lanthanoid, actinoid, Ti, Zr, Hf, Bi, V, Nb, Ta, W, Mn, Fe, Co, Ni. Examples of powdery oxides with multiple metal elements that are generally referred to as double oxides are classified from their crystal structures. Perovskite-structured double oxides include $NaNbO_3$, $SrZrO_3$, $PbZrO_3$, $SrTiO_3$, $BaZrO_3$, $PbTiO_3$, $BaTiO_3$; spinel-structured double oxides include $MgAl_2O_4$, $ZnAl_2O_4$, $CoAl_2O_4$, $NiAl_2O_4$, $MgFe_2O_4$; ilmenite-structured double salts include $MgTiO_3$, $MnTiO_3$, $FeTiO_3$; and garnet-structured double salts include $GdGa_5O_{12}$, $Y_6Fe_5O_{12}$. These powdery ceramics may be used herein either singly or as combined.

One preferred method of molding ceramic powder by the use of the polyvinyl acetal of the invention for a binder for ceramic forming is a sheet-forming method, and it comprises applying a slurry of essentially organic solvent, ceramic powder and polyvinyl acetal, onto a carrier film by the use of a blade coater or the like, then drying it, and peeling it from the carrier film to obtain a ceramic green sheet. In this method, the slurry to be applied to the carrier film may optionally contain deflocculant, plasticizer, lubricant and the like, in addition to the essential ingredients of organic solvent, ceramic powder and polyvinyl acetal.

The amount of the polyvinyl acetal to be in the ceramic green sheet could not be unconditionally defined as it varies depending on the use and the object of the ceramic green sheet. Generally, however, it may be from 3 to 20 parts by weight, preferably from 5 to 15 parts by weight relative to 100 parts by weight of the ceramic powder.

When ceramic powder is molded according to the method mentioned above, it must be well dispersed in the slurry thereof. Methods of dispersing ceramic powder in slurry are not specifically defined, and various methods may be employed for it. For example, employable is a method of using a medium-assisted dispersing machine such as bead mill, ball mill, attritor, paint shaker, sand mill; a method of solid kneading; or a method of using a three-roll kneader. If desired, a dispersant may be used for dispersing ceramic powder in slurry. The dispersant may be an anionic dispersant having a carboxylic acid group, maleic acid group, a sulfonic acid group or a phosphoric acid group in the molecule. Preferably, the anionic dispersant does not have a metal ion.

The thickness of the ceramic green sheet could not be unconditionally defined as it varies depending on the use and the object thereof. In general, however, it falls between 1 and 300 $\mu$m. The drying temperature at which the coating film formed on the carrier film is dried could not also be unconditionally defined as it varies depending on the thickness and other parameters of the ceramic green sheet to be obtained. In general, however, it may fall between 60 and 200° C. or so.

The ceramic green sheets obtained by molding ceramic powder along with the polyvinyl acetal of the invention that serves as a binder for ceramic forming are favorable for various electronic parts. In particular, they are favorable for chip-type monolithic capacitors that are fabricated by forming an electrode on a ceramic green sheet, piling up them and bonding them under pressure, and baking both the electrode and the ceramic at the same time, and also for IC chip circuit boards.

When the polyvinyl acetal of the invention is used for binders for ink or paint, the polyvinyl acetal content of ink or paint is preferably from 1 to 35% by weight, more preferably from 5 to 25% by weight. Ink and paint may contain, for example, from 5 to 25% by weight of pigment, from 5 to 25% by weight of polyvinyl acetal, and some solvent.

The pigment to be in ink or paint may be any and every known organic or inorganic pigment. The solvent that may be in ink or paint includes, for example, alcohols such as ethyl alcohol, and esters such as ethyl acetate.

The binder for ink or paint that comprises the polyvinyl acetal of the invention may be combined with any other extender resin and auxiliary agent. The polyvinyl acetal of the invention may serve by itself as an additive to ink.

Using the binder for ink or paint of the invention brings about the following advantages: The viscosity of the solution obtained by adding one or more pigments to a solution of the binder followed by kneading the resulting pigment paste is lower than the solution viscosity that is estimated from the viscosity of the polyvinyl acetal itself. Therefore, compared with a binder for ink or paint that comprises a known polyvinyl acetal, the binder for ink or paint that comprises the polyvinyl acetal of the invention significantly lowers the solution viscosity. This means that the binder that comprises the polyvinyl acetal of the invention reduces the necessary amount of varnish or solvent to be used in controlling the viscosity of ink or paint, and it increases the acceptable pigment content of ink or paint. As a result, the binder for ink or paint of the invention satisfies the requirements heretofore needed for ink and paint in that it may increase the degree of coloration while keeping the optimum viscosity as it is, or it may lower the viscosity not changing the degree of coloration.

The thermally-developable photosensitive material that comprises the polyvinyl acetal of the invention may be fabricated by applying a coating liquid which comprises polyvinyl acetal, organic silver salt and/or photosensitive silver halide, reducing agent and solvent, onto a support and optionally crosslinking it with an isocyanate group-having compound.

The amount of the organic silver salt to be in the photographic material is preferably from 1 to 500 parts by weight, more preferably from 2 to 50 parts by weight relative to 10 parts by weight of the polyvinyl acetal therein. Also preferably, the organic silver salt has a particle size of from 0.01 to 10 $\mu$m, more preferably from 0.1 to 5 $\mu$m. The organic silver salt is not specifically defined, and it maybe any and every colorless or white silver salt that is relatively stable to light and is capable of being reduced with a reducing agent in the presence of an exposed silver halide at a temperature not lower than 80° C. to give a metal silver. Examples of the organic silver salt are silver salts of mercaptans such as 3-mercapto-4-phenyl-1,2,4-triazole, 2-mercapto-5-aminothiazole, 1-phenyl-5-mercaptotetrathiazole, 2-mercaptobenzothiazole, mercaptoxadiazole, mercaptotriazine; silver salts of thione compounds such as thioamide, thiopyridine, S-2-aminophenylthiosulfuric acid; silver salts of organic carboxylic acids, such as aliphatic carboxylic acids, capric acid, lauric acid, myristic acid, palmitic acid, stearic acid, behenic acid, maleic acid, fumaric acid, tartaric acid, furoylic acid, linolic acid, oleic acid, hydroxystearic acid, adipic acid, sebacic acid, succinic acid, acetic acid, butyric acid, camphoric acid, dithiocarboxylic acids such as dithioacetic acid, thioglycolic acid, aromatic carboxylic acids, thione-carboxylic acids, thioether group-having aliphatic carboxylic acids; silver salts of imidazoles such as 2-mercaptobenzimidazole; silver salts of tetrazaindenes; silver-containing metallic aminoalcohols, organic acid-silver chelate compounds. Of those, preferred are silver salts of aliphatic carboxylic acids; and more preferred is silver behenate.

The amount of the photosensitive silver halide to be in the photographic material is preferably from 0.0005 to 0.2 parts by weight, more preferably from 0.01 to 0.2 parts by weight relative to 100 parts by weight of the organic silver salt therein. The photosensitive silver halide is not specifically defined, and may be any one capable of reacting with an organic silver salt to form a silver halide. In view of is reactivity, preferred are iodide ion-containing silver halides. Examples of the silver halide are silver bromide, silver iodide, silver chloride, silver chlorobromide, silver iodobromide, silver chloroiodide.

An organic silver salt may be combined with a photosensitive silver halide to be in the photosensitive materials of the invention. In this case, the photosensitive silver halide may catalytically act on the organic silver salt. Methods for contacting a photosensitive silver halide with an organic silver salt are not specifically defined. For it, for example, employable is a method of making a photosensitive silver halide-forming component react with a previously-prepared solution or dispersion of an organic silver salt or a film with an organic silver salt therein, to thereby convert a part of the organic silver salt into silver halide.

The amount of the reducing agent to be in the photosensitive material is preferably from 0.0001 to 3 parts by weight, more preferably from 0.01 to 1 part by weight relative to 100 parts by weight of the organic silver salt therein. Not specifically defined, the reducing agent may be suitably selected depending on the type of the organic silver salt to be used in the photosensitive material. Examples of the reducing agent are substituted phenols, bisphenols, naphthols, bisnaphthols, polyhydroxybenzenes, di or polyhydroxynaphthols, di or polyhydroxynaphthalenes, hydroquinones, hydroquinone monoethers, ascorbic acid and its derivatives, reducing saccharides, aromatic amino compounds, hydroxyamines, hydrazines, phenidones, hindered phenols. Of those, preferred are photolytic or pyrolytic reducing agents, and more preferred are hindered phenols. If desired, a photolytic reducing agent may be combined with a photolysis promoter, or a masking agent that retards the reaction between the organic silver salt and the reducing agent may be used along with the reducing agent.

The solvent that is used in preparing the coating liquids for the thermally-developable photosensitive material may be any one capable of dissolving the polyvinyl acetal of the invention, and is not specifically defined. Examples of the solvent are ketones such as diethyl ketone, methyl ethyl ketone, methyl isobutyl ketone; and esters such as methyl acetate, ethyl acetate, propyl acetate. The water content of the solvent is preferably as small as possible.

For preparing a coating liquid that comprises polyvinyl acetal, organic silver salt and/or photosensitive silver halide, reducing agent and solvent, for example, these components are dispersed in a ball mill or the like for at least 12 hours, then a reducing agent is added thereto, and the resulting mixture is further dispersed for a few hours.

Thus prepared, the coating liquid is applied onto a support, for which employable is any known coating method. For example, a method of using a wire bar, and a method of using a blade coater are employable. The amount of the coating liquid to be on the support is preferably from 0.1 to 5 g m$^2$, more preferably from 0.3 to 3 g/m$^2$ in terms of the dispersion amount of silver in the coating film formed. If the amount of the coating liquid is smaller than 0.1 g/m$^2$, the image density of the developed material may lower; but even if larger than 5 g/m$^2$, the image density of the developed material could no more increase.

The support to be coated with the coating liquid is not specifically defined, including, for example, resin films of polyesters such as polyethylene terephthalate, polyethylene naphthalate; carbonates such as polycarbonate; olefins such as polyethylene, polypropylene; celluloses such as cellulose triacetate, cellulose diacetate; acetals such as polyvinyl acetal; halogen-containing polymers such as polyvinyl chloride, polypropylene chloride; as well as metal plates of aluminium or the like; and glass, paper.

The thermally-developable photosensitive material may contain any other additive such as color-toning agent. For forming black images, a black-toning agent is added to it. For forming color images, color coupler, leuco dye or the like is added to it. Further if desired, the thermally-developable photosensitive material may contain an optical sensitizer.

As having the advantages as above, the polyvinyl acetal of the invention is usable for interlayer films for laminated glass, binders for ceramic forming, binders for ink or paint, and thermally-developable photosensitive materials. In addition to these, the polyvinyl acetal is also favorable for a component of lacquer, or for crosslinking with urea resins, melamine resins or epoxy resins.

EXAMPLES

The invention is described in more detail with reference to the following Examples, which, however, are not intended to restrict the scope of the invention. In the following Examples and Comparative Examples, "part" and "%" are all by weight unless otherwise specifically indicated.

Method of Analyzing PVA:

Unless otherwise specifically indicated, PVA is analyzed according to the method described in JIS-K6726.

The amount of the α-olefin monomer, the content of carboxylic acid and lactone ring, and 1,2-glycol bond content in PVA are obtained according to the methods mentioned above, using a 500-MHz proton NMR device (JEOL GX-500).

Method of Analyzing Polyvinyl Acetal:

The degree of acetalization of polyvinyl acetal is obtained by analyzing a sample of the polymer dissolved in DMSO-d6, using a 500-MHz proton NMR device (JEOL GX-500).

Production Example

Production of PVA:

124.4 kg of vinyl acetate and 25.5 kg of methanol were fed into a 250-liter pressure reactor equipped with a stirrer, a nitrogen inlet duct, an ethylene inlet duct, an initiator inlet mouth and a delay solution inlet mouth, then heated up to 60° C., and then bubbled with nitrogen gas for 30 minutes to purge the system with nitrogen. Next, ethylene was introduced thereinto to make the reactor have a pressure of 0.48 MPa. An initiator, 2,2'-azobis(4-methoxy-2,4-dimethylvaleronitrile) was dissolved in methanol to prepare a solution having a concentration of 2.8 g/liter, and this was bubbled with nitrogen gas to purge it with nitrogen. The inner temperature of the reactor was controlled at 60° C., and 90 ml of the initiator solution was led into the reactor to initiate the polymerization of the monomers. During the polymerization, the system temperature was kept at 60° C., and the initiator solution was continuously added to the system at a rate of 280 ml/hr. After 4 hours when the conversion reached 40%, the reactor was cooled to stop the polymerization therein. During the polymerization, the reactor was so operated that its pressure could gradually lower, and at the end of the polymerization, the pressure in the reactor lowered to 0.44 MPa. After the polymerization was stopped, the reactor was opened for ethylene removal. Then, this was bubbled with nitrogen gas for complete ethylene removal. Next, methanol vapor was introduced into the polymerized reaction liquid to expel the non-reacted vinyl acetate monomer from the liquid. The methanol solution thus obtained contained 40% of polyvinyl ester.

To the methanol solution that contains 40% of polyvinyl ester, added were a predetermined methanol and a methanol solution that contains 10% by weight of sodium hydroxide in that order, and the polyvinyl ester was hydrolyzed at 40° C. At the start of hydrolysis, the solid concentration of the polyvinyl ester in the solution was 30% by weight. Adding the sodium hydroxide-containing methanol solution was effected with stirring, and the amount of sodium hydroxide added was 0.02 in terms of the molar ratio to the vinyl acetate units in the polyvinyl ester. The gel product obtained in about 2 minutes after the start of the addition of the sodium hydroxide-containing methanol solution was ground in a mill, and left at 40° C. for 1 hour to promote the hydrolysis. Next, methyl acetate was added to the system to neutralize the remaining alkali. With a phenolphthalein indicator, the finish of neutralization was confirmed, and then a white PVA solid was taken out through filtration. Methanol of 5 times was added to the thus-obtained PVA solid and left at room temperature for 3 hours to wash the PVA solid. The washing operation was repeated three times. Thus washed, the PVA solid was dewatered through centrifugation, and then dried in a drier at 70° C. for 1 day. PVA thus obtained is referred to as PVA-1a.

Changing the reaction condition as in Tables 1 to 6, other various PVAs (PVA-2a to PVA-30a, and PVA-1b to PVA-24b) were produced in the same manner as that for PVA-1a. The analytical data of each PVA are given in Table 7 to Table 12.

TABLE 1

| | | | | | | Comonomer expect α-olefin | | | |
|---|---|---|---|---|---|---|---|---|---|
| PVA | VAc (kg) | MeOH (kg) | α-olefin | Initial Gauge Pressure (MPa) | Final Gauge Pressure (MPa) | type of comonomer[1] | initial feed (g) | total amount added (g) | Initiator[2] |
| PVA-1a | 124.4 | 25.5 | ethylene | 0.48 | 0.44 | no | — | — | AMV |
| PVA-2a | 124.4 | 25.5 | ethylene | 0.48 | 0.44 | no | — | — | AMV |
| PVA-3a | 130.5 | 19.5 | ethylene | 0.39 | 0.37 | no | — | — | AMV |
| PVA-4a | 130.5 | 19.5 | ethylene | 0.39 | 0.37 | no | — | — | AMV |
| PVA-5a | 124.4 | 25.5 | ethylene | 0.48 | 0.44 | IA | 52.9 | 753 | AMV |
| PVA-6a | 94.8 | 44.9 | ethylene | 0.32 | 0.3 | no | — | — | AMV |
| PVA-7a | 127.5 | 22.5 | propylene | 0.3 | 0.27 | no | — | — | AMV |
| PVA-8a | 130.8 | 19.1 | ethylene | 0.68 | 0.64 | no | — | — | AMV |
| PVA-9a | 124.4 | 25.5 | ethylene | 0.48 | 0.44 | VC | 1260 | 1260 | AMV |
| PVA-10a | 124.4 | 25.5 | ethylene | 0.48 | 0.44 | VC | 1260 | 1260 | AMV |
| PVA-11a | 124.4 | 25.5 | ethylene | 0.48 | 0.44 | MMM | 530 | 2610 | AMV |

| PVA | Total Amount of Initiator Added (ml) | Polymerization Temp. (° C.) | Polymerization Time (hr) | Conversion (%) | Polyvinyl Ester Concentration (%) | NaOH molar ratio |
|---|---|---|---|---|---|---|
| PVA-1a | 1210 | 60 | 4 | 40 | 30 | 0.02 |
| PVA-2a | 1210 | 60 | 4 | 40 | 30 | 0.012 |
| PVA-3a | 630 | 80 | 4 | 40 | 30 | 0.02 |
| PVA-4a | 630 | 80 | 4 | 40 | 30 | 0.01 |
| PVA-5a | 1450 | 60 | 4 | 40 | 30 | 0.05 |
| PVA-6a | 490 | 40 | 3 | 20 | 30 | 0.02 |
| PVA-7a | 630 | 60 | 3 | 20 | 30 | 0.02 |
| PVA-8a | 1360 | 60 | 4 | 40 | 30 | 0.025 |
| PVA-9a | 1550 | 60 | 4 | 40 | 30 | 0.02 |

TABLE 1-continued

| | | | | | | |
|---|---|---|---|---|---|---|
| PVA-10a | 1550 | 60 | 4 | 40 | 30 | 0.01 |
| PVA-11a | 1630 | 60 | 4 | 40 | 30 | 0.05 |

[1] IA: itaconic acid, VC: vinylene carbonate, MMM: monomethyl maleate
[2] AMV: 2,2'-azobis(4-methoxy-2,4-dimethylvaleronitrile)

TABLE 2

| PVA | VAc (kg) | MeOH (kg) | α-olefin | Initial Gauge Pressure (MPa) | Final Gauge Pressure (MPa) | Comonomer expect α-olefin | | | Initiator[2] |
|---|---|---|---|---|---|---|---|---|---|
| | | | | | | type of comonomer[1] | initial feed (g) | total amount added (g) | |
| PVA-1b | 102 | 48 | no | — | — | no | — | — | AMV |
| PVA-2b | 144.1 | 58.5 | ethylene | 1.56 | 1.55 | no | — | — | AMV |
| PVA-3b | 124.4 | 25.5 | ethylene | 0.48 | 0.44 | no | — | — | AMV |
| PVA-4b | 75.3 | 74.7 | ethylene | 0.14 | 0.12 | MMM | 3.1 | 9.3 | NPP |
| PVA-5b | 124.4 | 25.5 | ethylene | 0.48 | 0.44 | VC | 2150 | 2150 | AMV |
| PVA-6b | 148 | 2 | ethylene | 0.83 | 0.83 | no | — | — | AMV |
| PVA-7b | 105 | 45 | no | — | — | MMM | 456 | 2236 | AMV |

| PVA | Total Amount of Initiator Added (ml) | Polymerization Temp. (° C.) | Polymerization Time (hr) | Conversion (%) | Polyvinyl Ester Concentration (%) | NaOH molar ratio |
|---|---|---|---|---|---|---|
| PVA-1b | 810 | 60 | 4 | 40 | 30 | 0.02 |
| PVA-2b | 250 | 60 | 2 | 10 | 30 | 0.05 |
| PVA-3b | 1210 | 60 | 4 | 40 | 30 | 0.004 |
| PVA-4b | 1850 | 10 | 3 | 20 | 30 | 0.02 |
| PVA-5b | 1680 | 60 | 4 | 40 | 30 | 0.02 |
| PVA-6b | 400 | 60 | 3 | 20 | 25 | 0.02 |
| PVA-7b | 1250 | 60 | 4 | 40 | 30 | 0.05 |

[1] MMM: monomethyl maleate, VC: vinylene carbonate
[2] AMV: 2,2'-azobis(4-methoxy-2,4-dimethylvaleronitrile), NPP: (n-propyl peroxycarbonate)/N,N-dimethylaniline = 1/1

TABLE 3

| PVA | VAc (kg) | MeOH (kg) | α-olefin | Initial Gauge Pressure (MPa) | Final Gauge Pressure (MPa) | Comonomer expect α-olefin | | | Initiator[2] |
|---|---|---|---|---|---|---|---|---|---|
| | | | | | | type of comonomer[1] | initial feed (g) | total amount added (g) | |
| PVA-12a | 99.7 | 50.2 | ethylene | 0.23 | 0.17 | no | — | — | AMV |
| PVA-13a | 130 | 20.1 | ethylene | 0.61 | 0.6 | no | — | — | AIBN |
| PVA-14a | 61.7 | 76.3 | ethylene | 0.09 | 0.06 | no | — | — | AMV |
| PVA-15a | 109.8 | 39.8 | ethylene | 0.57 | 0.49 | IA | 97.2 | 1380 | AMV |
| PVA-16a | 71.7 | 78.3 | ethylene | 0.3 | 0.25 | no | — | — | AMV |
| PVA-17a | 119.3 | 30.4 | propylene | 0.34 | 0.32 | no | — | — | AMV |
| PVA-18a | 109.9 | 39.8 | ethylene | 0.57 | 0.49 | no | — | — | AMV |
| PVA-19a | 109.9 | 39.8 | ethylene | 0.57 | 0.49 | no | — | — | AMV |

| PVA | Total Amount of Initiator Added (ml) | Polymerization Temp. (° C.) | Polymerization Time (hr) | Conversion (%) | Polyvinyl Ester Concentration (%) | NaOH molar ratio |
|---|---|---|---|---|---|---|
| PVA-12a | 1490 | 60 | 5 | 50 | 30 | 0.02 |
| PVA-13a | 50 | 120 | 3 | 20 | 30 | 0.02 |
| PVA-14a | 3490 | 30 | 4 | 30 | 30 | 0.02 |
| PVA-15a | 3180 | 60 | 5 | 40 | 30 | 0.06 |
| PVA-16a | 4460 | 20 | 4 | 30 | 30 | 0.02 |
| PVA-17a | 4530 | 60 | 4 | 40 | 30 | 0.02 |
| PVA-18a | 1100 | 60 | 5 | 40 | 30 | 0.02 |
| PVA-19a | 1100 | 60 | 5 | 40 | 30 | 0.12 |

[1] IA: itaconic acid
[2] AMV: 2,2'-azobis(4-methoxy-2,4-dimethylvaleronitrile), AIBN: 2,2'-azobis(isobutyronitrile)

TABLE 4

| PVA | VAc (kg) | MeOH (kg) | α-olefin | Initial Gauge Pressure (MPa) | Final Gauge Pressure (MPa) | Comonomer expect α-olefin | | | Initiator[2] |
|---|---|---|---|---|---|---|---|---|---|
| | | | | | | type of comonomer[1] | initial feed (g) | total amount added (g) | |
| PVA-8b | 85.5 | 64.5 | no | — | — | no | — | — | AMV |
| PVA-9b | 134 | 15.5 | ethylene | 1.5 | 1.39 | no | — | — | AMV |
| PVA-10b | 109.9 | 39.8 | ethylene | 0.57 | 0.49 | no | — | — | AMV |
| PVA-11b | 54.9 | 95.1 | ethylene | 0.22 | 0.17 | IA | 0.34 | 1.5 | NPP[1] |
| PVA-12b | 109.9 | 39.8 | ethylene | 0.57 | 0.49 | VC | 2106 | — | AMV |
| PVA-13b | 87 | 63 | no | — | — | IA | 120.2 | 1700 | AMV |

| PVA | Total Amount of Initiator Added (ml) | Polymerization Temp. (° C.) | Polymerization Time (hr) | Conversion (%) | Polyvinyl Ester Concentration (%) | NaOH molar ratio |
|---|---|---|---|---|---|---|
| PVA-8b | 900 | 60 | 4 | 50 | 30 | 0.02 |
| PVA-9b | 1750 | 60 | 5 | 40 | 30 | 0.05 |
| PVA-10b | 1100 | 60 | 5 | 40 | 30 | 0.005 |
| PVA-11b | 2560 | 0 | 3 | 10 | 30 | 0.02 |
| PVA-12b | 1450 | 60 | 5 | 40 | 30 | 0.02 |
| PVA-13b | 1830 | 60 | 4 | 40 | 30 | 0.08 |

[1]IA: itaconic acid, VC: vinylene carbonate
[2]AMV: 2,2'-azobis(4-methoxy-2,4-dimethylvaleronitrile), NPP: (n-propyl peroxycarbonate)/N,N-dimethylaniline = 1/1

TABLE 5

| PVA | VAc (kg) | MeOH (kg) | α-olefin | Initial Gauge Pressure (MPa) | Final Gauge Pressure (MPa) | Comonomer expect α-olefin | | | Initiator[2] |
|---|---|---|---|---|---|---|---|---|---|
| | | | | | | type of comonomer[1] | initial feed (g) | total amount added (g) | |
| PVA-20a | 42.2 | 107.5 | ethylene | 0.18 | 0.02 | no | — | — | AMV |
| PVA-21a | 78.5 | 71 | ethylene | 0.33 | 0.22 | no | — | — | AMV |
| PVA-22a | 53 | 95.1 | ethylene | 0.45 | 0.13 | no | — | — | AMV |
| PVA-23a | 28.9 | 107.8 | ethylene | 0.08 | 0.01 | VC | 64.4 | 64.4 | AMV |
| PVA-24a | 41.9 | 107.6 | ethylene | 0.41 | 0.03 | no | — | — | AMV |
| PVA-25a | 42.2 | 107.5 | ethylene | 0.18 | 0.02 | MMM | 24.9 | 200.3 | AMV |
| PVA-26a | 33.6 | 116.3 | propylene | 0.14 | 0.08 | no | — | — | AMV |
| PVA-27a | 53.3 | 96.4 | ethylene | 0.61 | 0.29 | IA | 73.7 | 1645 | AMV |
| PVA-28a | 53.3 | 96.4 | ethylene | 0.61 | 0.29 | IA | 154 | 3396 | AMV |
| PVA-29a | 42.2 | 107.5 | ethylene | 0.18 | 0.02 | VC | 448 | 448 | AMV |
| PVA-30a | 78.5 | 71 | ethylene | 0.33 | 0.22 | VC | 832 | 832 | AMV |

| PVA | Total Amount of Initiator Added (ml) | Polymerization Temp. (° C.) | Polymerization Time (hr) | Conversion (%) | Polyvinyl Ester Concentration (%) | NaOH molar ratio |
|---|---|---|---|---|---|---|
| PVA-20a | 5340 | 60 | 5 | 70 | 55 | 0.015 |
| PVA-21a | 1820 | 60 | 5 | 50 | 35 | 0.015 |
| PVA-22a | 7280 | 60 | 5 | 70 | 55 | 0.018 |
| PVA-23a | 9310 | 40 | 5 | 70 | 55 | 0.025 |
| PVA-24a | 15860 | 60 | 6 | 85 | 60 | 0.03 |
| PVA-25a | 7400 | 60 | 5 | 70 | 55 | 0.011 |
| PVA-26a | 1120 | 60 | 4 | 40 | 55 | 0.02 |
| PVA-27a | 7250 | 60 | 5 | 65 | 55 | 0.09 |
| PVA-28a | 8530 | 60 | 5 | 65 | 55 | 0.16 |
| PVA-29a | 6140 | 60 | 5 | 70 | 55 | 0.015 |
| PVA-30a | 2050 | 60 | 5 | 50 | 35 | 0.015 |

[1]VC: vinylene carbonate, MMM: monomethyl maleate, IA: itaconic acid
[2]AMV: 2,2'-azobis(4-methoxy-2,4-dimethylvaleronitrile)

TABLE 6

| PVA | VAc (kg) | MeOH (kg) | α-olefin | Initial Gauge Pressure (MPa) | Final Gauge Pressure (MPa) | type of comonomer[1] | initial feed (g) | total amount added (g) | Initiator[2] |
|---|---|---|---|---|---|---|---|---|---|
| PVA-14b | 31.5 | 118.5 | no | — | — | no | — | — | AMV |
| PVA-15b | 67.5 | 82.5 | no | — | — | no | — | — | AMV |
| PVA-16b | 22.5 | 127.5 | no | — | — | no | — | — | AMV |
| PVA-17b | 42.2 | 107.5 | ethylene | 0.18 | 0.02 | no | — | — | AMV |
| PVA-18b | 63.6 | 86 | ethylene | 1.11 | 0.64 | no | — | — | AMV |
| PVA-19b | 20.5 | 129.1 | ethylene | 0.05 | 0.01 | no | — | — | AMV |
| PVA-20b | 15 | 135 | no | — | — | no | — | — | AMV |
| PVA-21b | 15.51 | 134.5 | ethylene | 0.01 | 0.01 | no | — | — | NPP |
| PVA-22b | 42.2 | 107.5 | ethylene | 0.18 | 0.02 | VC | 752 | 752 | AMV |
| PVA-23b | 32.5 | 117.8 | ethylene | 0.02 | 0.01 | no | — | — | NPP |
| PVA-24b | 78.5 | 71 | ethylene | 0.33 | 0.22 | VC | 1398 | 1398 | AMV |

| PVA | Total Amount of Inititator Added (ml) | Polymerization Temp. (° C.) | Polymerization Time (hr) | Conversion (%) | Polyvinyl Ester Concentration (%) | NaOH molar ratio |
|---|---|---|---|---|---|---|
| PVA-14b | 13600 | 60 | 6 | 75 | 55 | 0.013 |
| PVA-15b | 10100 | 60 | 5 | 65 | 35 | 0.013 |
| PVA-16b | 24070 | 60 | 7 | 85 | | |
| PVA-17b | 5340 | 60 | 5 | 70 | 55 | 0.006 |
| PVA-18b | 8450 | 60 | 5 | 65 | | |
| PVA-19b | 35600 | 60 | 8 | 90 | 75 | 0.04 |
| PVA-20b | 30870 | 60 | 8 | 90 | 75 | 0.04 |
| PVA-21b | 28970 | 0 | 8 | 70 | 55 | 0.015 |
| PVA-22b | 6850 | 60 | 5 | 70 | 55 | 0.015 |
| PVA-23b | 18950 | 0 | 8 | 60 | 35 | 0.15 |
| PVA-24b | 2630 | 60 | 5 | 50 | 35 | 0.015 |

[1]VC: vinylene carbonate
[2]AMV: 2,2'-azobis(4-methoxy-2,4-dimethylvaleronitrile), NPP: (n-propyl peroxycarbonate)/N,N-dimethylaniline = 1/1

TABLE 7

| PVA | α-olefin | Degree of Modification (mol %) | Degree of Polymerization | Degree of Hydrolysis (mol %) | 1,2-glycol Content (mol %) | Amount of Carboxylic Acid and Lactone Ring (mol %) |
|---|---|---|---|---|---|---|
| PVA-1a | ethylene | 5 | 1520 | 98.5 | 1.45 | 0.041 |
| PVA-2a | ethylene | 5 | 1520 | 95.6 | 1.45 | 0.041 |
| PVA-3a | ethylene | 3 | 1510 | 98.4 | 1.7 | 0.053 |
| PVA-4a | ethylene | 3 | 1510 | 93.7 | 1.7 | 0.53 |
| PVA-5a | ethylene | 5 | 1490 | 98.6 | 1.45 | 1 |
| PVA-6a | ethylene | 5 | 1530 | 98.3 | 1.23 | 0.025 |
| PVA-7a | propylene | 2 | 1520 | 98.8 | 1.49 | 0.021 |
| PVA-8a | ethylene | 7 | 1550 | 98.3 | 1.42 | 0.043 |
| PVA-9a | ethylene | 5 | 1480 | 98.7 | 2.5 | 0.041 |
| PVA-10a | ethylene | 5 | 1480 | 92.6 | 2.5 | 0.041 |
| PVA-11a | ethylene | 5 | 1470 | 98.5 | 1.45 | 3 |

TABLE 8

| PVA | α-olefin | Degree of Modification (mol %) | Degree of Polymerization | Degree of Hydrolysis (mol %) | 1,2-glycol Content (mol %) | Amount of Carboxylic Acid and Lactone Ring (mol %) |
|---|---|---|---|---|---|---|
| PVA-1b | no | 0 | 1550 | 98.5 | 1.52 | 0.038 |
| PVA-2b | ethylene | 17 | 1450 | 98.2 | 1.26 | 0.022 |
| PVA-3b | ethytene | 5 | 1520 | 75.2 | 1.52 | 0.041 |
| PVA-4b | ethylene | 5 | 1560 | 98.9 | 0.93 | 0.032 |
| PVA-5b | ethylene | 5 | 1480 | 98.2 | 3.2 | 0.041 |
| PVA-6b | ethylene | 8 | 2300 | 98.5 | 1.4 | 0.024 |
| PVA-7b | no | 0 | 1470 | 98.5 | 1.52 | 3 |

TABLE 9

| PVA | α-olefin | Degree of Modification (mol %) | Degree of Polymerization | Degree of Hydrolysis (mol %) | 1,2-glycol Content (mol %) | Amount of Carboxylic Acid and Lactone Ring (mol %) |
|---|---|---|---|---|---|---|
| PVA-12a | ethylene | 3 | 1010 | 98.8 | 1.48 | 0.053 |
| PVA-13a | ethylene | 3 | 970 | 98.7 | 2.24 | 0.127 |
| PVA-14a | ethylene | 3 | 1050 | 98.5 | 1.15 | 0.041 |
| PVA-15a | ethylene | 6.5 | 990 | 98.3 | 1.42 | 2 |
| PVA-16a | ethylene | 6.5 | 1040 | 98.4 | 1.01 | 0.022 |
| PVA-17a | propylene | 3 | 1000 | 98.5 | 1.48 | 0.045 |
| PVA-18a | ethylene | 6.5 | 1020 | 98.5 | 1.42 | 0.073 |
| PVA-19a | ethylene | 6.5 | 1020 | 93.2 | 1.42 | 0.073 |

TABLE 10

| PVA | α-olefin | Degree of Modification (mol %) | Degree of Polymerization | Degree of Hydrolysis (mol %) | 1,2-glycol Content (mol %) | Amount of Carboxylic Acid and Lactone Ring (mol %) |
|---|---|---|---|---|---|---|
| PVA-8b | no | 0 | 1050 | 98.6 | 1.52 | 0.075 |
| PVA-9b | ethylene | 17 | 980 | 98 | 1.26 | 0.043 |
| PVA-10b | ethylene | 6.5 | 1020 | 75.2 | 1.42 | 0.073 |
| PVA-11b | ethylene | 6.5 | 1080 | 98.5 | 0.82 | 0.032 |
| PVA-12b | ethylene | 6.5 | 970 | 98.5 | 3.3 | 0.075 |
| PVA-13b | no | 0 | 1000 | 98.5 | 1.52 | 3 |

TABLE 11

| PVA | α-olefin | Degree of Modification (mol %) | Degree of Polymerization | Degree of Hydrolysis (mol %) | 1,2-glycol Content (mol %) | Amount of Carboxylic Acid and Lactone Ring (mol %) |
|---|---|---|---|---|---|---|
| PVA-20a | ethylene | 5 | 200 | 96 | 1.45 | 0.07 |
| PVA-21a | ethylene | 5 | 550 | 97.3 | 1.45 | 0.05 |
| PVA-22a | ethylene | 9 | 200 | 96.5 | 1.39 | 0.04 |
| PVA-23a | ethylene | 5 | 200 | 99.5 | 1.45 | 0.005 |
| PVA-24a | ethylene | 10 | 130 | 99.1 | 1.37 | 0.1 |
| PVA-25a | ethylene | 5 | 200 | 91.5 | 1.45 | 0.5 |
| PVA-26a | propylene | 3 | 200 | 97.2 | 1.48 | 0.03 |
| PVA-27a | ethylene | 12 | 200 | 97.3 | 1.34 | 3 |
| PVA-28a | ethylene | 12 | 200 | 96.5 | 1.34 | 6 |
| PVA-29a | ethylene | 5 | 200 | 96 | 2.5 | 0.07 |
| PVA-30a | ethylene | 5 | 550 | 97.3 | 2.5 | 0.05 |

TABLE 12

| PVA | α-olefin | Degree of Modification (mol %) | Degree of Polymerization | Degree of Hydrolysis (mol %) | 1,2-glycol Content (mol %) | Amount of Carboxylic Acid and Lactone Ring (mol %) |
|---|---|---|---|---|---|---|
| PVA-14b | no | 0 | 200 | 96 | 1.52 | 0.1 |
| PVA-15b | no | 0 | 550 | 97.5 | 1.52 | 0.08 |
| PVA-16b | no | 0 | 130 | 99.1 | 1.52 | 0.12 |
| PVA-17b | ethylene | 5 | 200 | 75 | 1.45 | 0.07 |
| PVA-18b | ethylene | 20 | 200 | 95.8 | 1.22 | 0.03 |
| PVA-19b | ethylene | 5 | 70 | 96.2 | 1.45 | 0.2 |
| PVA-20b | ethylene | 0 | 70 | 95.7 | 1.52 | 0.24 |
| PVA-21b | ethylene | 5 | 200 | 96 | 0.84 | 0.03 |
| PVA-22b | ethylene | 5 | 200 | 96 | 3.2 | 0.07 |
| PVA-23b | ethylene | 5 | 550 | 97.3 | 0.84 | 0.03 |
| PVA-24b | ethylene | 5 | 550 | 97.3 | 3.2 | 0.05 |

Example 1

Production of Polyvinyl Acetal:

480 g of PVA (PVA-1a) was put into 5520 ml of water, dissolved therein under heat up to 90° C. with stirring, and then cooled to 30° C. 271 g of butylaldehyde was added to it and dispersed, and then cooled to 14° C. 72 g of 20% hydrochloric acid solution was dropwise added to it over a period of 20 minutes while the temperature of the solution was kept at 14° C., and the reaction was initiated. After the addition of the hydrochloric acid solution, the reaction was continued for 40 minutes while the temperature of the solution was still kept at 14° C. Then, 330 g of 20% hydrochloric acid solution was dropwise added to it over a period of 30 minutes, and after the addition, the reaction system was heated up to 65° C. at a heating rate of about 0.6° C./min. This was kept at the elevated temperature of 65° C. for 60 minutes. Next, the reaction solution was cooled to room temperature, and the granular product deposited was taken out through filtration and well washed with water. To neutralize it, the granular product was put into 0.3% potassium hydroxide solution, and the resulting solution was again gradually heated up to 70° C. Further, this was washed with water to remove the excess alkali, and the granular product was then dried. The polyvinyl acetal thus obtained is referred to as VAP-1a.

Other various polyvinyl acetals (VAP-2a to VAP-37a, and VAP-1b to VAP-30b) were produced in the same manner as that for VAP-1a, except that the reaction condition was varied as in Table 13 to Table 18. The analytical data of the thus-obtained polyvinyl acetals are given in Table 13 to Table 18.

TABLE 13

| Polyvinyl Acetal | PVA Used | Type of Aldehyde | Amount of Aldehyde Used (g) | Degree of Acetalization (mol %) |
|---|---|---|---|---|
| VAP-1a | PVA-1a | butylaldehyde | 271 | 70.5 |
| VAP-2a | PVA-2a | butylaldehyde | 264 | 72.5 |
| VAP-3a | PVA-3a | butylaldehyde | 275 | 71.2 |
| VAP-4a | PVA-4a | butylaldehyde | 254 | 72.6 |
| VAP-5a | PVA-5a | butylaldehyde | 284 | 73.4 |
| VAP-6a | PVA-6a | butylaldehyde | 266 | 68.9 |
| VAP-7a | PVA-7a | butylaldehyde | 273 | 70.1 |
| VAP-8a | PVA-8a | butylaldehyde | 270 | 69.5 |
| VAP-9a | PVA-9a | butylaldehyde | 280 | 71.5 |
| VAP-10a | PVA-10a | butylaldehyde | 252 | 72.5 |
| VAP-11a | PVA-11a | butylaldehyde | 290 | 75.3 |
| VAP-12a | PVA-1a | propionaldehyde | 246 | 78.9 |
| VAP-13a | PVA-1a | butylaldehyde | 217 | 56.2 |
| VAP-14a | PVA-1a | butylaldehyde | 310 | 79.1 |

TABLE 14

| Polyvinyl Acetal | PVA Used | Type of Aldehyde | Amount of Aldehyde Used (g) | Degree of Acetalization (mol %) |
|---|---|---|---|---|
| VAP-1b | PVA-1b | butylaldehyde | 271 | 70.3 |
| VAP-2b | PVA-2b | —[1] | —[1] | —[1] |
| VAP-3b | PVA-3b | butylaldehyde | 172 | 70.9 |
| VAP-4b | PVA-4b | butylaldehyde | 277 | 70.8 |
| VAP-5b | PVA-5b | butylaldehyde | 281 | 72.5 |
| VAP-6b | PVA-6b | —[1] | —[1] | —[1] |
| VAP-7b | PVA-7b | butylaldehyde | 271 | 69.6 |
| VAP-8b | PVA-1a | butylaldehyde | 155 | 40.5 |
| VAP-9b | PVA-1a | butylaldehyde | 321 | 82.5 |

[1] Since PVA did not completely dissolve in water, polyvinyl acetal could not be obtained.

TABLE 15

| Polyvinyl Acetal | PVA Used | Type of Aldehyde | Amount of Aldehyde Used (g) | Degree of Acetalization (mol %) |
|---|---|---|---|---|
| VAP-15a | PVA-12a | butylaldehyde | 285 | 72.5 |
| VAP-16a | PVA-13a | butylaldehyde | 280 | 71.5 |
| VAP-17a | PVA-14a | butylaldehyde | 263 | 67.8 |
| VAP-18a | PVA-15a | butylaldehyde | 255 | 65.8 |
| VAP-19a | PVA-16a | butylaldehyde | 266 | 68.2 |
| VAP-20a | PVA-17a | butylaldehyde | 287 | 73.6 |
| VAP-21a | PVA-18a | butylaldehyde | 271 | 69.4 |
| VAP-22a | PVA-19a | butylaldehyde | 238 | 67.4 |
| VAP-23a | PVA-18a | butylaldehyde | 222 | 56.2 |
| VAP-24a | PVA-18a | butylaldehyde | 312 | 79.4 |

TABLE 16

| Polyvinyl Acetal | PVA Used | Type of Aldehyde | Amount of Aldehyde Used (g) | Degree of Acetalization (mol %) |
|---|---|---|---|---|
| VAP-10b | PVA-8b | butylaldehyde | 280 | 71.9 |
| VAP-11b | PVA-9b | —[1] | —[1] | —[1] |
| VAP-12b | PVA-10b | butylaldehyde | 170 | 69.7 |
| VAP-13b | PVA-11b | butylaldehyde | 275 | 70.9 |
| VAP-14b | PVA-12b | butylaldehyde | 275 | 70.5 |
| VAP-15b | PVA-13b | butylaldehyde | 275 | 70.4 |
| VAP-16b | PVA-18a | butylaldehyde | 160 | 40.3 |
| VAP-17b | PVA-18a | butylaldehyde | 324 | 82.4 |

[1] Since PVA did not completely dissolve in water, polyvinyl acetal could not be obtained.

TABLE 17

| Polyvinyl Acetal | PVA Used | Type of Aldehyde | Amount of Aldehyde Used (g) | Degree of Acetalization (mol %) |
|---|---|---|---|---|
| VAP-25a | PVA-20a | butylaldehyde | 242 | 68.5 |
| VAP-26a | PVA-21a | butylaldehyde | 254 | 66.9 |
| VAP-27a | PVA-22a | butylaldehyde | 254 | 67.8 |
| VAP-28a | PVA-23a | butylaldehyde | 269 | 67.8 |
| VAP-29a | PVA-24a | butylaldehyde | 247 | 62.5 |
| VAP-30a | PVA-25a | butylaldehyde | 223 | 65.2 |
| VAP-31a | PVA-26a | butylaldehyde | 272 | 71.5 |
| VAP-32a | PVA-27a | butylaldehyde | 239 | 62.3 |
| VAP-33a | PVA-28a | butylaldehyde | 227 | 60.8 |
| VAP-34a | PVA-29a | butylaldehyde | 269 | 72.5 |
| VAP-35a | PVA-30a | butylaldehyde | 288 | 75.3 |
| VAP-36a | PVA-20a | propionaldehyde | 204 | 67.3 |
| VAP-37a | PVA-20a | butylaldehyde | 216 | 56.2 |

TABLE 18

| Polyvinyl Acetal | PVA Used | Type of Aldehyde | Amount of Aldehyde Used (g) | Degree of Acetalization (mol %) |
|---|---|---|---|---|
| VAP-18b | PVA-14b | butylaldehyde | 255 | 68.9 |
| VAP-19b | PVA-15b | butylaldehyde | 259 | 67.3 |
| VAP-20b | PVA-16b | butylaldehyde | 247 | 63 |
| VAP-21b | PVA-17b | butylaldehyde | 167 | 68.8 |
| VAP-22b | PVA-18b | —[1] | —[1] | —[1] |
| VAP-23b | PVA-19b | butylaldehyde | 259 | 69.8 |
| VAP-24b | PVA-20b | butylaldehyde | 257 | 69.6 |
| VAP-25b | PVA-17b | propionaldehyde | 202 | 67.5 |
| VAP-26b | PVA-20a | butylaldehyde | 155 | 41.2 |
| VAP-27b | PVA-21b | butylaldehyde | 255 | 68.7 |
| VAP-28b | PVA-22b | butylaldehyde | 255 | 68.4 |
| VAP-29b | PVA-23b | butylaldehyde | 265 | 69.2 |
| VAP-30b | PVA-24b | butylaldehyde | 265 | 67.9 |

[1] Since PVA did not completely dissolve in water, polyvinyl acetal could not be obtained.

Polyvinyl acetal (VAP-1a) was pressed at 230° C. under 20 MPa for 5 minutes into a film having a thickness of 200 μm, and its equilibrium water content and water absorption were measured according to the methods mentioned below. The data are given in Table 19.

Equilibrium Water Content:

The film is left at 20° C. and 90% RH for 2 weeks, and its equilibrium water content is obtained from the weight change of the film before and after the storage. The equilibrium water content of the film is calculated according to the following equation:

Equilibrium Water Content (%)=[(Weight of Film after stored−Weight of Film before stored)/(Weight of Film before stored)]×100.

Water Absorption:

The film is dipped in distilled water at 20° C. for 24 hours, and water having adhered to the surfaces of the film is completely wiped away with cotton gauze. From the weight change of the film before and after the dipping, the water absorption of the film is obtained. The water absorption is calculated according to the following equation:

Water Absorption (%)=[(Weight of Film after dipped−Weight of Film before dipped)/(Weight of Film before dipped)]×100.

The compatibility of polyvinyl acetal (VAP-1a) with plasticizer was evaluated according to the method mentioned below. The result is given in Table 19.

Compatibility with Plasticizer:

100 parts of polyvinyl acetal (VAP-1a) is plasticized with 40 parts of triethylene glycol di-2-ethylhexanoate added thereto, and this is kneaded with rolls at 70° C. for 5 minutes, and then pressed at 170° C. under 5 MPa into a plasticized film having a thickness of 0.6 mm. The weight (initial weight) of the plasticized film is measured. Then, the film is left at 30° C. and 80% RH for 2 weeks, and the plasticizer having bled out of the surface of the film is completely wiped off with a cotton gauze. Next, this is left in a desiccator with diphosphorus pentoxide therein for 2 weeks, and then its weight (after the test) is measured. The weight change of the plasticized film before and after the test is obtained according to the equation mentioned below, and the compatibility with plasticizer of the polyvinyl acetal tested is evaluated based on the standard mentioned below.

Weight Change (%)=[(initial weight−weight after test)/(initial weight)]×100.

Standard for Evaluation:
A: The weight change is less than 1%.
B: The weight change is from 1% to less than 3%.
C: The weight change is 3% or more.

Examples 2 to 14

Polyvinyl acetals (VAP-2a to VAP-14a) shown in Table 13 were analyzed in point of their equilibrium water content and water absorption and their compatibility with plasticizer was evaluated in the same manner as in Example 1. The data and the results are given in Table 19.

TABLE 19

| Example | Polyvinyl Acetal | Equilibrium Water Content (%) | Water Absorption (%) | Compatibility with Plasticizer |
|---|---|---|---|---|
| Example 1 | VAP-1a | 4.0 | 6.5 | A |
| Example 2 | VAP-2a | 3.7 | 6.1 | A |
| Example 3 | VAP-3a | 4.5 | 6.9 | A |
| Example 4 | VAP-4a | 4.2 | 6.6 | A |
| Example 5 | VAP-5a | 4.9 | 7.2 | B |
| Example 6 | VAP-6a | 3.9 | 6.4 | B |
| Example 7 | VAP-7a | 4.3 | 6.8 | B |
| Example 8 | VAP-8a | 3.5 | 6.0 | A |
| Example 9 | VAP-9a | 4.5 | 7.0 | B |
| Example 10 | VAP-10a | 4.2 | 6.8 | B |
| Example 11 | VAP-11a | 4.9 | 7.3 | B |
| Example 12 | VAP-12a | 5.3 | 7.8 | B |
| Example 13 | VAP-13a | 6.0 | 8.5 | B |
| Example 14 | VAP-14a | 3.2 | 3.3 | A |

Comparative Examples 1 to 9

Polyvinyl acetals (VAP-1b to VAP-9b) shown in Table 14 were analyzed in point of their equilibrium water content and water absorption and their compatibility with plasticizer was evaluated in the same manner as in Example 1. The data and the results are given in Table 20.

TABLE 20

| Comparative Example | Polyvinyl Acetal | Equilibrium Water Content (%) | Water Absorption (%) | Compatibility with Plasticizer |
|---|---|---|---|---|
| Comp. Example 1 | VAP-1b | 5.8 | 10.5 | C |
| Comp. Example 2 | VAP-2b | —[1] | —[1] | —[1] |
| Comp. Example 3 | VAP-3b | 5.3 | 9.7 | C |
| Comp. Example 4 | VAP-4b | 4.3 | 7.2 | C |
| Comp. Example 5 | VAP-5b | 5.1 | 9.8 | C |
| Comp. Example 6 | VAP-6b | —[1] | —[1] | —[1] |
| Comp. Example 7 | VAP-7b | 7.3 | 13.6 | C |
| Comp. Example 8 | VAP-8b | 15.2 | 28.5 | C |
| Comp. Example 9 | VAP-9b | 2.6 | 2.8 | C |

[1] Not produced, polyvinyl acetal could not be evaluated.

From the results in Table 19, it is understood that the polyvinyl acetals of the invention all have a low equilibrium water content and a low water absorption, and their compatibility with plasticizer is good. In particular, the polyvinyl butyrals (VAP-1a to VAP-4a, VAP-8a, VAP-14a) of which the 1,2-glycol bond content satisfies the formula (1) and the carboxylic acid and lactone ring content satisfies the formula (2) have a lower equilibrium water content and a lower water absorption, and their compatibility with plasticizer is better.

On the other hand, it is understood that the polyvinyl acetals falling outside the invention are not good and their compatibility with plasticizer is extremely bad, as in Table 20.

Example 15

Fabrication of Laminated Glass:

In the same manner as that for producing the plasticized film for evaluation of the compatibility of polyvinyl acetal with plasticizer in Example 1, a plasticized film having at thickness of 0.6 mm was produced, for which, however, 50 ppm of magnesium acetate was added to polyvinyl acetal (VAP-1a). Thus produced, the plasticized film was sandwiched between two sheets of glass (each having a thickness of 2.5 mm, a width of 300 mm and a length of 300 mm), put into a rubber bag, and pre-bonded by degassing the bag to a reduced pressure of 15 mmHg for 15 minutes and pressing it in vacuum at 100° C. for 20 minutes. Then, this was taken out of the rubber back, and finally bonded in an autoclave at 130° C. under 1.5 MPa for 15 minutes. Thus fabricated, the laminated glass was tested for whitening at it edges, according to the method mentioned below. In addition, the adhesiveness of the plasticized film to glass sheets was evaluated in terms of a pan mill value of the plasticized film tested. The results are given in Table 21.

Whitened Condition of Edges of Laminated Glass:

A sample of laminated glass to be evaluated is left at 80° C. and 95% RH for 1 month, and the whitened length of the sample is measured from its edge. The whitened length indicates the distance between the edge and the end of the continuously whitened area of the sample, and the whitened condition of the sample is evaluated according to the following standard.

A: The whitened length from the edge is less than 1 mm.
B: The whitened length from the edge is from 1 mm to less than 5 mm.
C: The whitened length from the edge is 5 mm or more.

Pan Mill Value:

A sample of laminated glass to be evaluated is left at −18° C. for at least 1 hour, and hit with a hammer of which the weight of the head is 1 pound. Then, this was ground until the size of the glass pieces reaches at most 6 mm. Thus broken, the glass pieces were shaken off, and the degree of exposure (%) of the plasticized film was determined in terms of a pan mill value, according to the standard mentioned below. In the samples having a larger pan mill value, the adhesiveness of the plasticized film to glass sheets is higher.

| Degree of Exposure (%) of Plasticized film | Pan Mill Value |
| --- | --- |
| 100 | 0 |
| 90 | 1 |
| 85 | 2 |
| 60 | 3 |
| 40 | 4 |
| 20 | 5 |
| 10 | 6 |
| 5 | 7 |
| 2 or less | 8 |

Examples 16 to 28

Interlayer films for laminated glass of polyvinyl acetals (VAP-2a to VAP-14a) shown in Table 13 were evaluated in point of the whitened condition of the glass edges and of the adhesiveness of the plasticized film to glass sheet, in the same manner as in Example 15. The results are given in Table 21.

TABLE 21

| Example | Polyvinyl Acetal | Whitened Condition of Edges | Pan Mill Value |
| --- | --- | --- | --- |
| Example 15 | VAP-1a | A | 8 |
| Example 16 | VAP-2a | A | 8 |
| Example 17 | VAP-3a | A | 8 |
| Example 18 | VAP-4a | A | 7 |
| Example 19 | VAP-5a | B | 7 |
| Example 20 | VAP-6a | B | 8 |
| Example 21 | VAP-7a | B | 8 |
| Example 22 | VAP-8a | A | 8 |
| Example 23 | VAP-9a | B | 7 |
| Example 24 | VAP-10a | B | 7 |
| Example 25 | VAP-11a | B | 6 |
| Example 26 | VAP-12a | B | 7 |
| Example 27 | VAP-13a | B | 7 |
| Example 28 | VAP-14a | A | 7 |

Comparative Examples 10 to 18

Interlayer films for laminated glass of polyvinyl acetals (VAP-1b to VAP-9b) shown in Table 14 were evaluated in point of the whitened condition of the glass edges and of the adhesiveness of the plasticized film to glass sheet, in the same manner as in Example 15. The results are given in Table 22.

TABLE 22

| Comparative Example | Polyvinyl Acetal | Whitened Condition of Edges | Pan Mill Value |
| --- | --- | --- | --- |
| Comp. Example 10 | VAP-1b | C | 3 |
| Comp. Example 11 | VAP-2b | —[1] | —[1] |
| Comp. Example 12 | VAP-3b | C | 4 |
| Comp. Example 13 | VAP-4b | C | 5 |
| Comp. Example 14 | VAP-5b | C | 6 |
| Comp. Example 15 | VAP-6b | —[1] | —[1] |
| Comp. Example 16 | VAP-7b | C | 5 |
| Comp. Example 17 | VAP-8b | C | 3 |
| Comp. Example 18 | VAP-9b | C | 6 |

[1]Not produced, polyvinyl acetal could not be evaluated.

From the results in Table 21, it is understood that the interlayer films for laminated glass, which are formed of the polyvinyl acetal of the invention, have good whitening resistance at the edges of laminated glass and good adhesiveness to glass sheets. In particular, the interlayer films formed of the polyvinyl butyrals (VAP-1a to VAP-4a, VAP-8a, VAP-14a) of which the 1,2-glycol bond content satisfies the formula (1) and the carboxylic acid and lactone ring content satisfies the formula (2) are good and well balanced in point of the whitening resistance at the edges of laminated glass and the adhesiveness to glass sheets.

On the other hand, it is understood that the interlayer films for laminated glass formed of polyvinyl acetals not falling within the scope of the invention are not good and their whitening resistance at the edges of laminated glass is extremely bad, as in Table 22.

Example 29

Fabrication of Ceramic Green Sheets:

100 parts of ceramic powder, barium titanate powder having a mean particle size of 0.2 μm, 10 parts of polyvinyl acetal (VAP-15a), 3 parts of plasticizer, dioctyl phthalate, and, as solvents, 60 parts of toluene and 60 parts of isopropanol were put into a ball mill along with 500 parts of zirconia balls (diameter, 2 mm), and milled therein for 16 hours. After defoamed under reduced pressure, a ceramic slurry was prepared. The ceramic slurry was applied onto a releasable polyethylene terephthalate film (PET film) with a doctor blade, and dried at 105° C. for 5 minutes. This was then peeled off from the PET film to be a ceramic green sheet having a thickness of 5 μm.

Thus obtained, the surface condition of the ceramic green sheet was evaluated according to the method mentioned below, and the mechanical strength thereof was measured according to the method also mentioned below. The data are given in Table 23.

Surface Condition of Ceramic Green Sheet:

With an optical microscope, the surface condition of the ceramic green sheet is observed, and the sheet is evaluated according to the standard mentioned below.

A: The surface is smooth and homogeneous with neither voids nor aggregated grains.

B: Though having no void, the surface is roughened in some degree owing to the presence of minor aggregated grains.

C: Having voids and aggregated grains, the surface is roughened.

Strength of Ceramic Green Sheet:

A sample of the ceramic green sheet is blanked to give a test piece of 40 mm×100 mm in size, and its toughness is measured with Shimadzu's Autograph DCS-100 (chuck-to-chuck distance 30 mm, pulling rate 10 mm/min, temperature 20° C.). One sample was measured 5 times and its data are averaged to be the toughness thereof. The toughness of the sample of Comparative Example 19 is 1.0, as a standard. Based on it, the toughness of the other samples is represented by a relative value (times)

Examples 30 to 38

Using polyvinyl acetals (VAP-16a to VAP-24a) shown in Table 15 for a binder for ceramic forming, ceramic green sheets were fabricated in the same manner as in Example 29. Their surface condition and mechanical strength were evaluated and measured, and the data are given in Table 23.

TABLE 23

| Example | Polyvinyl Acetal | Surface Condition of Ceramic Green Sheet | Strength of Ceramic Green Sheet |
| --- | --- | --- | --- |
| Example 29 | VAP-15a | A | 1.8 |
| Example 30 | VAP-16a | B | 1.4 |
| Example 31 | VAP-17a | B | 1.3 |
| Example 32 | VAP-18a | B | 1.4 |
| Example 33 | VAP-19a | B | 1.4 |
| Example 34 | VAP-20a | B | 1.3 |
| Example 35 | VAP-21a | A | 1.7 |
| Example 36 | VAP-22a | A | 1.7 |
| Example 37 | VAP-23a | B | 1.3 |
| Example 38 | VAP-24a | A | 1.4 |

Comparative Examples 19 to 26

Using polyvinyl acetals (VAP-10b to VAP-17b) shown in Table 16 for a binder for ceramic forming, ceramic green sheets were fabricated in the same manner as in Example 29. Their surface condition and mechanical strength were evaluated and measured, and the data are given in Table 24.

TABLE 24

| Comparative Example | Polyvinyl Acetal | Surface Condition of Ceramic Green Sheet | Strength of Ceramic Green Sheet |
| --- | --- | --- | --- |
| Comp. Example 19 | VAP-10b | C | 1.0 |
| Comp. Example 20 | VAP-11b | —[1] | —[1] |
| Comp. Example 21 | VAP-12b | C | 1.1 |
| Comp. Exammp 22 | VAP-13b | C | 1.2 |
| Comp. Example 23 | VAP-14b | C | 1.2 |
| Comp. Example 24 | VAP-15b | C | 0.9 |
| Comp. Example 25 | VAP-16b | C | 0.8 |
| Comp. Example 26 | VAP-17b | C | 1.2 |

[1]Not produced, polyvinyl acetal could not be evaluated.

From the results in Table 23, it is understood that the ceramic green sheets, in which is used the polyvinyl acetal of the invention for the binder for ceramic molding, have a good surface condition and their mechanical strength is good. In particular, the surface condition of the ceramic green sheets, in which is used the polyvinyl butyral (VAP-15a, VAP-21a, VAP-22a, VAP-24a) that satisfies the formula (1) in point of the 1,2-glycol bond content thereof and satisfies the formula (2) in point of the carboxylic acid and lactone ring content thereof, is better and the mechanical strength thereof is higher.

On the other hand, it is understood that the ceramic green sheets, in which is used the polyvinyl acetals not falling within the scope of the invention for the binder for ceramic molding, all have a poor surface condition, as in Table 24.

Example 39

Preparation of Pigment Dispersion:

Some ethanol solutions of polyvinyl acetal (VAP-25a) that differ in the solid concentration of the polymer therein were prepared, and the outflow time of each solution was measured with a 4 mm-DIN cup (DIN53211/23° C.). Of those, the ethanol solution of polyvinyl acetal (VAP-25a) of which the polymer concentration was so controlled that the outflow time of the solution could be 20 seconds was selectively produced. 100 g of pigment (Hostaperm Blue B2G) was added to 400 g of the ethanol solution, and the resulting mixture was homogenized, and kneaded with glass beads for 30 minutes with cooling. Then, this was sieved to remove the glass beads to give a pigment dispersion.

Thus obtained, the viscosity of the pigment dispersion and the pigment content thereof were measured according to the methods mentioned below. The data are given in Table 25.

Viscosity of Pigment Dispersion (Cup Outflow Time):

The outflow time of the pigment dispersion from a 6-mm DIN cup (DIN53211/23° C.) is measured.

Pigment Content of Pigment Dispersion:

The pigment dispersion that was used for measuring its cup outflow time was diluted with ethanol so that its Hoeppler viscosity at 23° C. could be 10 mPa.s, and the pigment content of the dispersion was calculated. The pigment content of each sample analyzed is in terms of the ratio (times) based on the pigment content, 1.0, of the pigment dispersion of Comparative Example 27.

Examples 40 to 48

Pigment dispersions of polyvinyl acetals (VAP-27a, VAP-28a, VAP-30a to VAP-34a, VAP-36a, and VAP-37a) shown in Table 17 were analyzed for the viscosity of the pigment dispersion and for the pigment content thereof, in the same manner as in Example 39. The data are given in Table 25. The pigment content of each sample analyzed is in terms of the ratio (times) based on the pigment content, 1.0, of the pigment dispersion of Comparative Example 27.

Comparative Examples 27 to 33

Pigment dispersions of polyvinyl acetals (VAP-18b, VAP-21b, VAP-22b, and VAP-25b to VAP-28b) shown in Table 18 were analyzed for the viscosity of the pigment dispersion and for the pigment content thereof, in the same manner as in Example 39. The data are given in Table 25. The pigment content of each sample analyzed is in terms of the ratio (times) based on the pigment content, 1.0, of the pigment dispersion of Comparative Example 27.

TABLE 25

| Example | Polyvinyl Acetal | Outflow Time (sec) | Pigment Content (times) |
|---|---|---|---|
| Example 39 | VAP-25a | 10 | 2.9 |
| Example 40 | VAP-27a | 12 | 2.3 |
| Example 41 | VAP-28a | 13 | 1.9 |
| Example 42 | VAP-30a | 14 | 1.9 |
| Example 43 | VAP-31a | 18 | 1.4 |
| Example 44 | VAP-32a | 12 | 1.7 |
| Example 45 | VAP-33a | 13 | 1.4 |
| Example 46 | VAP-36a | 14 | 1.6 |
| Example 47 | VAP-37a | 16 | 1.7 |
| Example 48 | VAP-34a | 16 | 1.4 |
| Comp. Example 27 | VAP-18b | 25 | 1 |
| Comp. Example 28 | VAP-21b | 22 | 1 |
| Comp. Example 29 | VAP-22b | —[1] | —[1] |
| Comp. Example 30 | VAP-25b | 28 | 0.8 |
| Comp. Example 31 | VAP-26b | 26 | 0.9 |
| Comp. Example 32 | VAP-27b | 24 | 1.1 |
| Comp. Example 33 | VAP-28b | 23 | 1.1 |

[1]Not produced, polyvinyl acetal could not be evaluated.

Example 49 and Example 50

Pigment dispersions of polyvinyl acetals (VAP-26a, VAP-35a) shown in Table 17 were analyzed for the viscosity of the pigment dispersion and for the pigment content thereof, in the same manner as in Example 39. The data are given in Table 26. The pigment content of each sample analyzed is in terms of the ratio (times) based on the pigment content, 1.0, of the pigment dispersion of Comparative Example 34.

Comparative Examples 34 to 36

Pigment dispersions of polyvinyl acetals (VAP-19b, VAP-29b, VAP-30b) shown in Table 18 were analyzed for the cup outflow time of the pigment dispersion and for the pigment content thereof, in the same manner as in Example 39. The data are given in Table 26. The pigment content of each sample analyzed is in terms of the ratio (times) based on the pigment content, 1.0, of the pigment dispersion of Comparative Example 34.

TABLE 26

| Example | Polyvinyl Acetal | Outflow Time (sec) | Pigment Content (times) |
|---|---|---|---|
| Example 49 | VAP-26a | 16 | 2.8 |
| Example 50 | VAP-35a | 22 | 1.5 |
| Comp. Example 34 | VAP-19b | 35 | 1 |
| Comp. Example 35 | VAP-29b | 30 | 1.1 |
| Comp. Example 36 | VAP-30b | 29 | 1.1 |

Example 51 and Comparative Example 37

Pigment dispersions of polyvinyl acetals (VAP-29a, VAP-24b) shown in Table 17 and Table 18 were analyzed for the cup outflow time of the pigment dispersion and for the pigment content thereof, in the same manner as in Example 39. The data are given in Table 27. The pigment content of each sample analyzed is in terms of the ratio (times) based on the pigment content, 1.0, of the pigment dispersion of Comparative Example 37.

TABLE 27

| Example | Polyvinyl Acetal | Outflow Time (sec) | Pigment Content (times) |
|---|---|---|---|
| Example 51 | VAP-29a | 12 | 1.6 |
| Comp. Example 37 | VAP-24b | 18 | 1 |

Comparative Examples 38 and 39

Pigment dispersions of polyvinyl acetals (VAP-23b, VAP-24b) shown in Table 18 were analyzed for the cup outflow time of the pigment dispersion and for the pigment content thereof, in the same manner as in Example 39. The data are given in Table 28. The pigment content of each sample analyzed is in terms of the ratio (times) based on the pigment content, 1.0, of the pigment dispersion of Comparative Example 38.

TABLE 28

| Example | Polyvinyl Acetal | Outflow Time (sec) | Pigment Content (times) |
|---|---|---|---|
| Comp. Example 38 | VAP-23b | 11 | 1 |
| Comp. Example 39 | VAP-24b | 12 | 1 |

From the data in Table 25 to Table 28, it is understood that the pigment dispersions, in which is used the polyvinyl acetal of the invention for the binder for ink or paint, all have a low viscosity and have a high pigment content. In particular, the polyvinyl butyrals (VAP-25a, VAP-27a, VAP-30a, VAP-26a, VAP-29a), of which the 1,2-glycol bond content satisfies the formula (1) and the carboxylic acid and lactone ring content satisfies the formula (2), are more effective for further reducing the viscosity of the pigment dispersions and for further increasing the pigment content thereof.

On the other hand, it is understood that the polyvinyl acetals not falling within the scope of the invention are ineffective for reducing the viscosity of pigment dispersions containing the polymer and for increasing the pigment content thereof.

Example 52

Preparation of Coating Liquid for Thermally-Developable Photographic Materials:

10 parts by weight of polyvinyl acetal (VAP-25a), 11 parts by weight of silver behenate and 85 parts by weight of methyl isobutyl ketone were mixed in a ball mill at room temperature for 12 hours, to which was added 0.3 parts by weight of N-lauryl-1-hydroxy-2-naphthamide. This was again mixed in a ball mill at room temperature for 12 hours to prepare a coating liquid.

Thus prepared, the coating liquid was evaluated for the storage stability thereof, according to the method mentioned below. Using the coating liquid, a thermally-developable photosensitive material was fabricated, and its thermal developability and the image stability of the developed material were evaluated according to the methods mentioned below. The results are given in Table 29.

Storage Stability of Coating Liquid:

The coating liquid is left in a room at 25° C. for 1 week while exposed to a fluorescent lamp, and the degree of its coloration is visually determined according to the standard mentioned below.

A: No change found at all.
B: A little but negligible change found.
C: Some change found.
D: Obvious change found.

Thermal Developability:

Using a blade coater, the coating liquid was applied onto a polyethylene terephthalate support in such a manner that the dry thickness of the coating layer could be 8 μm, and then dried. Next, a solution of 0.4 parts by weight of N,N-dimethyl-p-phenyleneamine lead sulfate, 2 parts by weight of polyvinylpyrrolidone and 30 parts by weight of methanol was applied onto it in such as manner that the dry thickness of the coating layer could be 1.5 μm, and dried. The process gave a thermally-developable photosensitive material.

Thus fabricated, the thermally-developable photosensitive material was exposed to a 250-W high-pressure mercury lamp through a gradation pattern film from a distance of 25 cm, for a period of 0.5 mm seconds. This was kept in contact with a hot metal plate heated at 125° C. for 4 seconds, and was thus developed. The developability of the thus-processed material was visually evaluated according to the standard mentioned below.

A: The image is sharp with no fog.
B: Though fogged a little, the image is relatively sharp.
C: The image is fogged, and its sharpness is not so good.
D: The image is much fogged and is not sharp.

Image Stability of Developed Material:

The developed image is exposed to a white lamp for 1 week, and the image stability is visually evaluated according to the standard mentioned below.

A: The image pattern contrast is not disordered.
B: The image pattern contrast is disordered a little, but is relatively good.
C: The image pattern contrast is disordered.
D: The image pattern contrast is much disordered.

Examples 53 to 61, and Comparative Examples 40 to 46

Using the polyvinyl acetals (VAP-27a, VAP-28a, VAP-30a to VAP-34a, VAP-36a, VAP-37a, VAP-18b, VAP-21b, VAP-22b, VAP-25b to VAP-28b) shown in Table 17 and Table 18, coating liquids for thermally-developable photographic materials were prepared. The storage stability of the coating liquids, the thermal developability of the photographic materials and the image stability of the developed materials were evaluated in the same manner as in Example 52. The results are given in Table 29.

TABLE 29

| Example | Polyvinyl Acetal | Storage Stability of Coating Liquid | Thermal Developability | Image Stability |
|---|---|---|---|---|
| Example 52 | VAP-25a | A | A | A |
| Example 53 | VAP-27a | A | A | A |
| Example 54 | VAP-28a | B | B | A |
| Example 55 | VAP-30a | A | A | A |
| Example 56 | VAP-31a | B | B | A |
| Example 57 | VAP-32a | A | B | B |
| Example 58 | VAP-33a | A | B | B |
| Example 59 | VAP-34a | A | A | B |
| Example 60 | VAP-36a | B | A | A |
| Example 61 | VAP-37a | B | B | A |
| Comp. Ex. 40 | VAP-18b | D | D | D |
| Comp. Ex. 41 | VAP-21b | B | C | D |
| Comp. Ex. 42 | VAP-22b | —[1] | —[1] | —[1] |
| Comp. Ex. 43 | VAP-25b | C | D | D |
| Comp. Ex. 44 | VAP-26b | D | D | D |
| Comp. Ex. 45 | VAP-27b | D | B | B |
| Comp. Ex. 46 | VAP-28b | B | C | D |

[1]Not produced, polyvinyl acetal could not be evaluated.

Examples 62, 63, and Comparative Examples 47 to 49

Using the polyvinyl acetals (VAP-26a, VAP-35a, VAP-19b, VAP-29b, VAP-30b) shown in Table 17 and Table 18, coating liquids for thermally-developable photographic materials were prepared. The storage stability of the coating liquids, the thermal developability of the photographic materials and the image stability of the developed materials were evaluated in the same manner as in Example 52. The results are given in Table 30.

TABLE 30

| Example | Polyvinyl Acetal | Storage Stability of Coating Liquid | Thermal Developability | Image Stability |
|---|---|---|---|---|
| Example 62 | VAP-26a | A | A | A |
| Example 63 | VAP-35a | A | A | B |
| Comp. Ex. 47 | VAP-19b | D | D | D |
| Comp. Ex. 48 | VAP-29b | D | B | B |
| Comp. Ex. 49 | VAP-30b | B | C | D |

From the results in Table 29 and Table 30, it is understood that the coating liquids for thermally-developable photographic materials, which contain the polyvinyl acetal of the invention, all have good storage stability, and the thermal developability of the photographic materials fabricated by the use of the coating liquid is good, and the image stability of the developed materials is also good. In particular, when the polyvinyl butyrals that satisfy the formula (1) in point of the 1,2-glycol bond content thereof and satisfy the formula (2) in point of the carboxylic acid and lactone ring content thereof (VAP-25a, VAP-27a, VAP-30a, VAP-26a) are used, the storage stability of the coating liquids for thermally-developable photographic materials is better, and the thermally-developable photographic materials fabricated by the use of the coating liquids are good and well balanced in point of the thermal developability thereof and the image stability of the developed materials.

On the other hand, it is understood that, when coating liquids for thermally-developable photographic materials are prepared by the use of polyvinyl acetals not falling within the scope of the invention, then, their storage stability is not good, and, in addition, the thermal developability of the photographic materials fabricated by the use of the coating liquids and the image stability of the developed materials are extremely bad.

As described in detail hereinabove with reference to its preferred embodiments, the polyvinyl acetal of the invention has good waterproofness and good compatibility with plasticizer as compared with conventional polyvinyl acetals.

The interlayer film for laminated glass, which comprises the polyvinyl acetal of the invention, has good adhesiveness to glass sheets and exhibits good whitening resistance at the edges of laminated glass with it.

When the polyvinyl acetal of the invention is used for binders for ceramic forming, it gives ceramic green sheets of good surface condition and good mechanical strength.

When the polyvinyl acetal of the invention is sued for binders for ink or paint, it gives ink and paint having a low solution viscosity and a high solid content (high pigment content) and having good ink dispersibility. The ink or paint thus produced may have an increased pigment content when it has a desired viscosity for printing or painting. Therefore, even when the film formed by printing or painting is thin, its color intensity is high. Having the advantage, therefore, the ink is favorable to high-speed printers.

The thermally-developable photographic material that comprises the polyvinyl acetal of the invention has good thermal developability, and the image stability of the developed material is good. In addition, the storage stability of the coating liquids that are prepared in fabricating the thermally-developable photographic material is good.

Although the present invention has been fully described in connection with the preferred embodiments thereof, those skilled in the art will readily conceive of numerous changes and modifications within the framework of obviousness upon the reading of the specification herein presented of the present invention. Accordingly, such changes and modifications are, unless they depart from the scope of the present invention as delivered from the claimed annexed thereto, to be construed as included herein.

What is claimed is:

1. A polyvinyl acetal having a degree of acetalization ranging from 45 to 80 mol %, which is obtained by the acetalization of a polyvinyl alcohol that contains from 1 to 15 mol % of α-olefin units and has a 1,2-glycol bond content ranging from 1 to 3 mol %, a degree of polymerization ranging from 100 to 2000 and a degree of hydrolysis ranging from 80.0 to 99.99 mol % with an aliphatic aldehyde or benzaldehyde.

2. The polyvinyl acetal as claimed in claim 1, wherein the α-olefin units are ethylene units.

3. The polyvinyl acetal as claimed in claim 1, which is a polyvinyl butyral.

4. The polyvinyl acetal as claimed in claim 1, wherein the polyvinyl alcohol satisfies the following expression (1):

$$-0.012 \times Fn + 1.24 \leq \text{content (mol \%)} \leq -0.022 \times Fn + 2.23 \tag{1}$$

wherein the content (mol %) is the 1,2-glycol bond content of PVA; and Fn is the α-olefin unit content (mol %) of PVA.

5. The polyvinyl acetal as claimed in claim 1, wherein the polyvinyl alcohol contains from 0.02 to 5 mol % of carboxylic acid and lactone rings.

6. The polyvinyl acetal as claimed in claim 5, wherein the polyvinyl alcohol satisfies the following expression (1):

$$-1.95 \times 10^{-5} \times P + 0.045 \leq \text{content (mol \%)} \leq -1.38 \times 10^{-4} \times P + 0.91 \tag{2}$$

wherein the content (mol %) is the content of carboxylic acid and lactone rings in PVA; and P indicates the viscosity-average degree of polymerization of PVA.

7. An interlayer film for laminated glass, which comprises, as the essential ingredient, the polyvinyl acetal of claim 1.

8. A laminated glass that is fabricated from the interlayer film of claim 7 as a component of the glass.

9. A binder material of the formation of a ceramic which comprises the polyvinyl acetal of claim 1.

10. A binder material for the preparation of an ink or paint, which comprises the polyvinyl acetal of claim 1.

11. A thermally-developable photographic material, which comprises the polyvinyl acetal of claim 1.

12. The polyvinyl acetal as claimed in claim 1, wherein the polyvinyl alcohol has a degree of hydrolysis ranging from 85 to 99.99 mol %.

13. The polyvinyl acetal as claimed in claim 1, wherein the α-olefin unit content ranges from 2 to 10 mol %.

14. The polyvinyl acetal as claimed in claim 13, wherein the α-olefin unit content ranges from 3 to 7 mol %.

15. The polyvinyl acetal as claimed in claim 1, wherein the α-olefin is propylene, 1-butene, 1-pentene, 1-hexene, 1-heptene, 1-octene, 1-nonene or 1-decene.

16. The polyvinyl acetal as claimed in claim 1, wherein the aliphatic aldehyde is formaldehyde, acetaldehyde, propionaldehyde, butylaldehyde or hexylaldehyde.

17. The polyvinyl acetal as claimed in claim 16, wherein the aldehyde is butylaldehyde or benzaldehyde.

18. The polyvinyl acetal as claimed in claim 16, wherein the aliphatic aldehyde is combined with a carboxylic acid-containing aldehyde.

19. A polyvinyl acetal having a degree of acetalization ranging from 45 to 80 mol %, which is obtained by the acetalization of a polyvinyl alcohol that contains from 1 to 15 mol % of α-olefin units and has a 1,2-glycol bond content ranging from 1 to 3 mol %, a degree of polymerization ranging from 100 to 2000 and a degree of hydrolysis ranging from 80.0 to 99.99 mol %, the polyvinyl alcohol satisfying the expression (1):

$$-0.012 \times Fn + 1.24 \leq \text{content (mol \%)} \leq -0.022 \times Fn + 2.23 \tag{1}$$

wherein the content (mol %) is the 1,2-glycol bond content of PVA, and Fn is the α-olefin unit content (mol %) of PVA, with an aliphatic aldehyde or benzaldehyde.

* * * * *